Sept. 27, 1932.　　　I. SIKORSKY　　　1,879,716
AMPHIBIAN AIRCRAFT
Original Filed June 7, 1929　　23 Sheets-Sheet 5
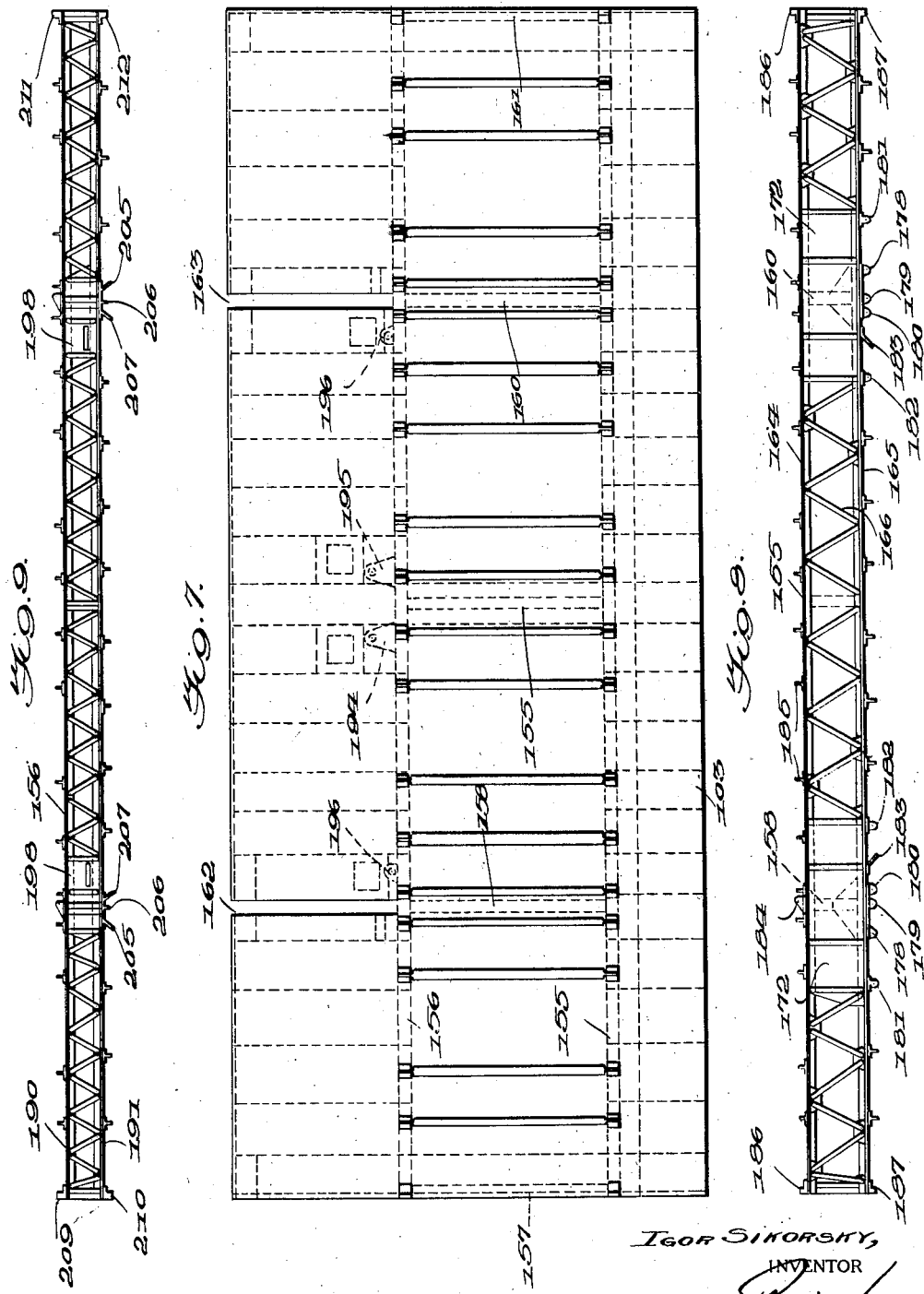

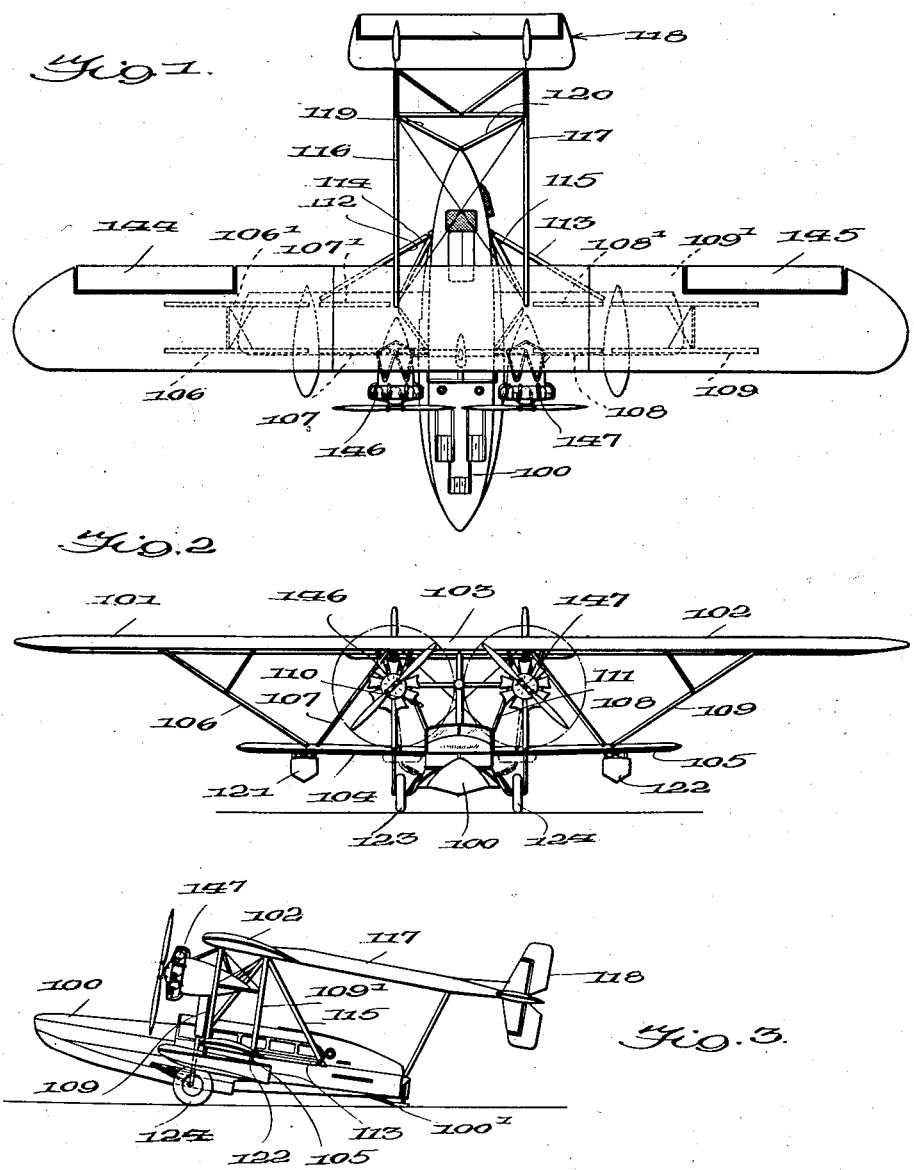

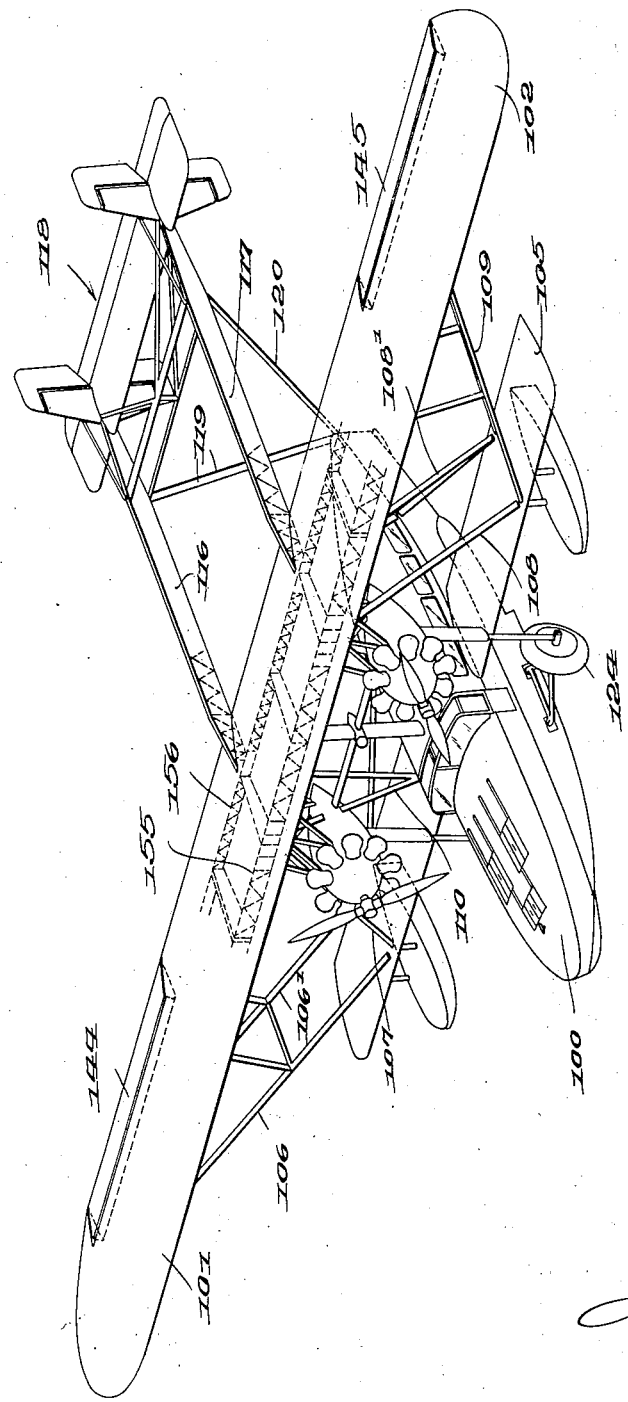

Sept. 27, 1932.  I. SIKORSKY  1,879,716
AMPHIBIAN AIRCRAFT
Original Filed June 7, 1929   23 Sheets-Sheet 6
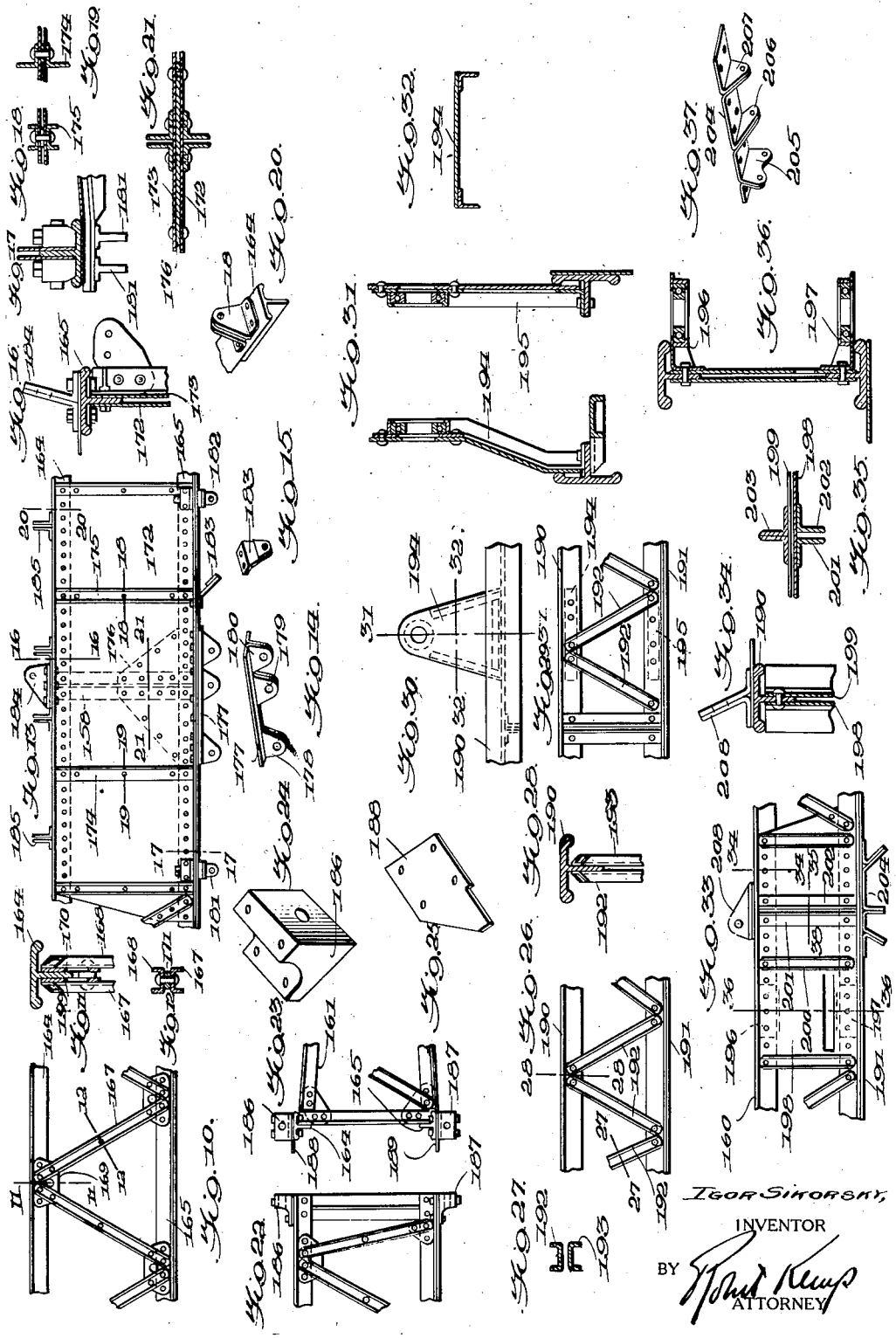

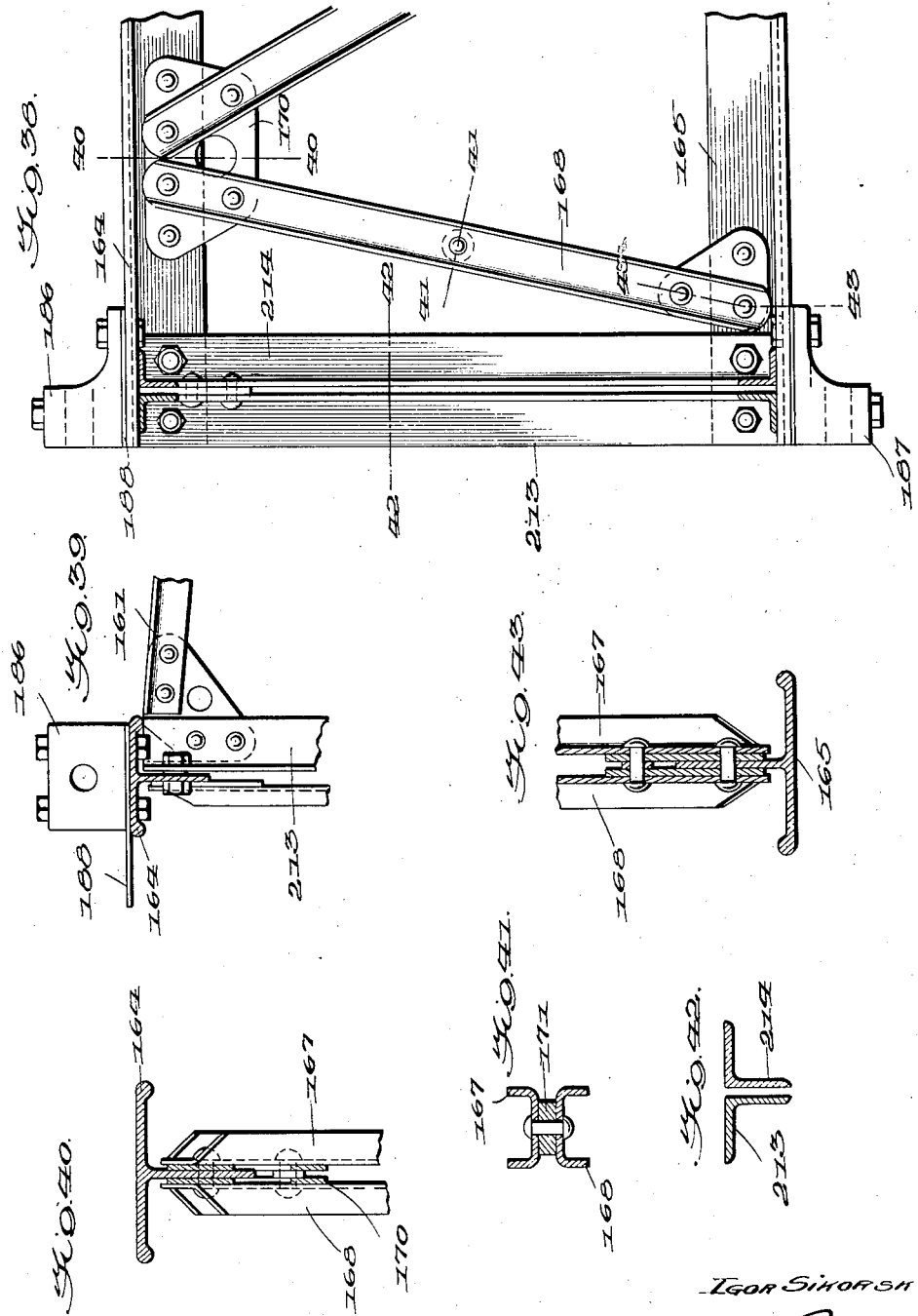

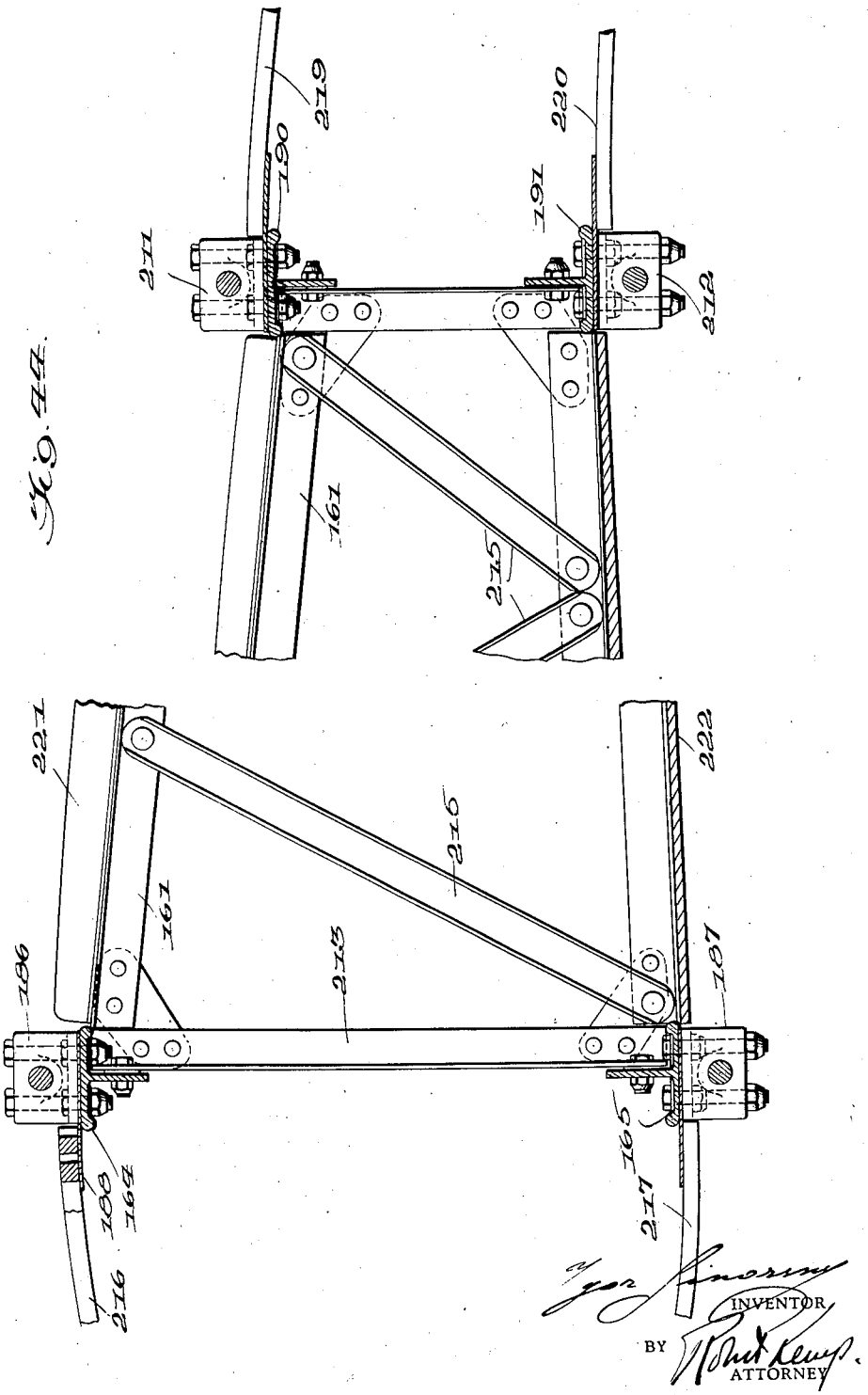

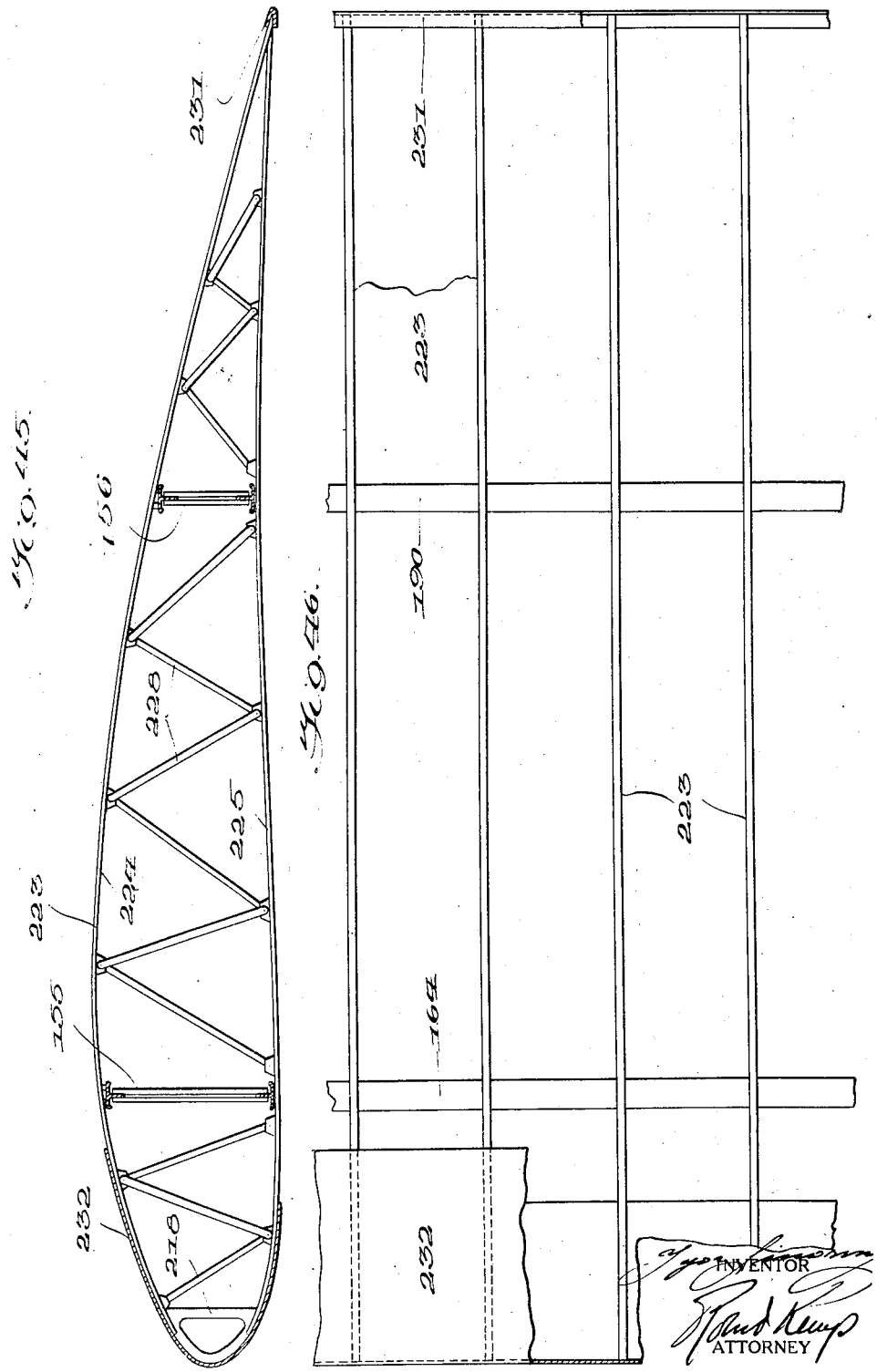

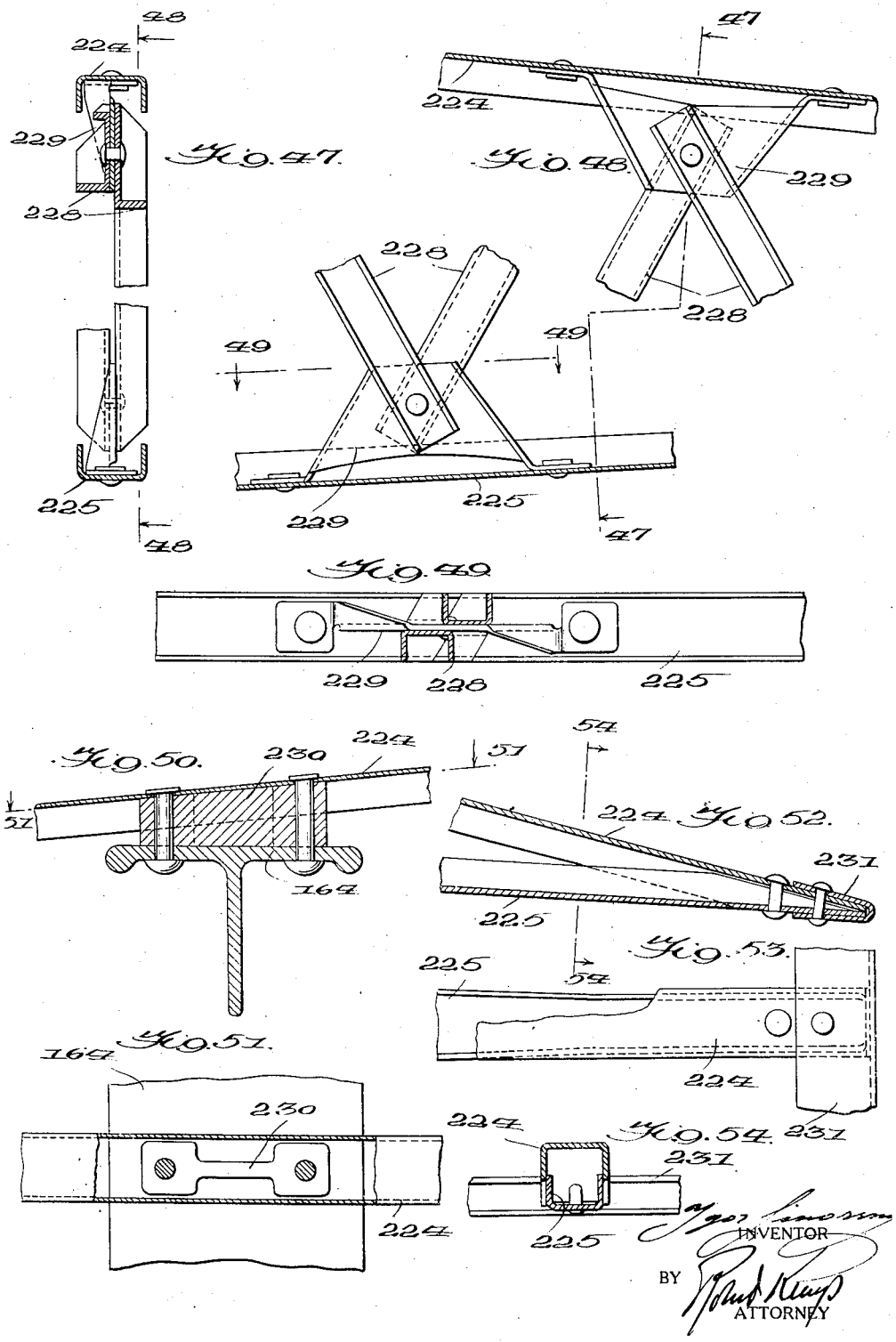

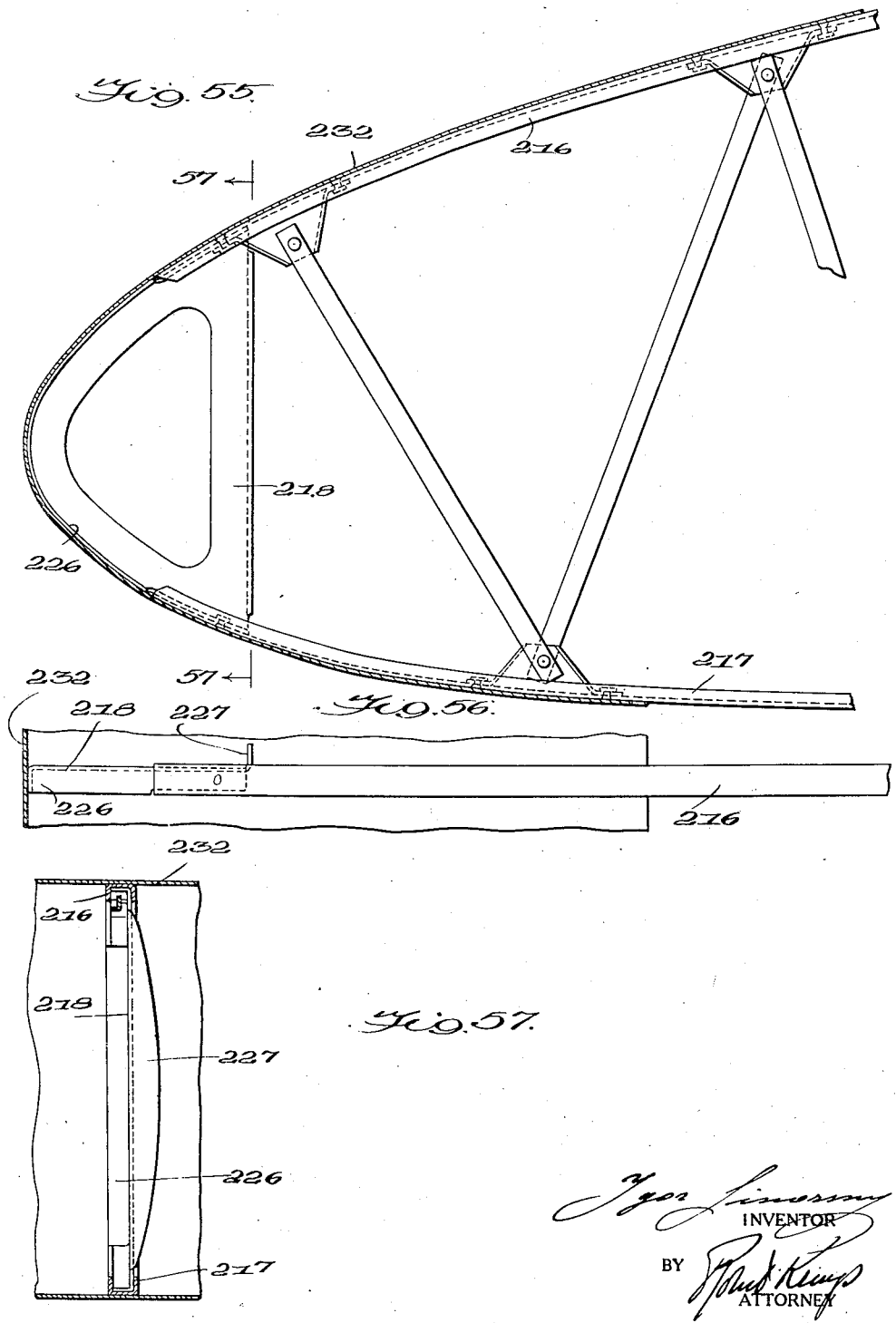

Sept. 27, 1932.  I. SIKORSKY  1,879,716
AMPHIBIAN AIRCRAFT
Original Filed June 7, 1929  23 Sheets-Sheet 12
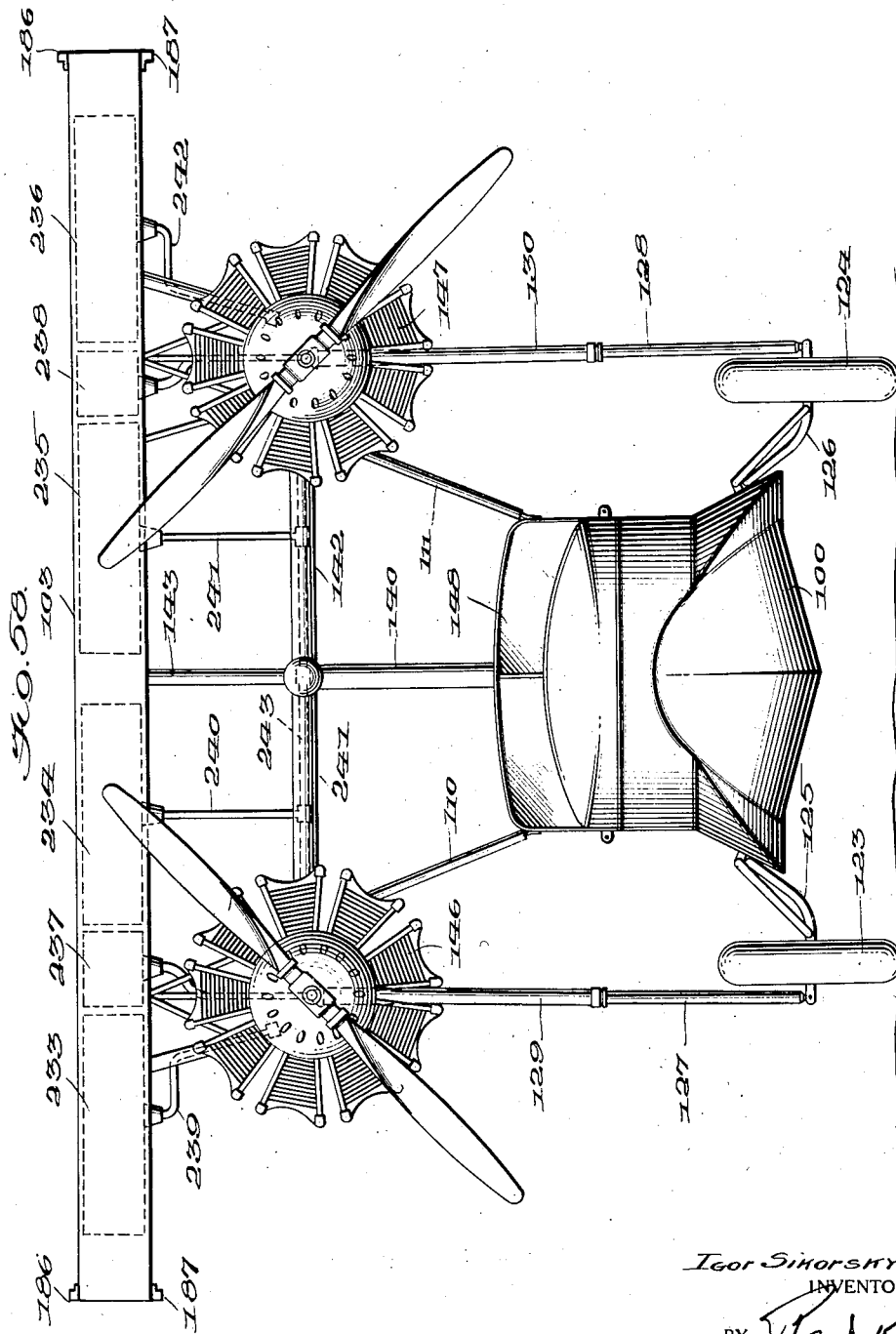
Igor Sikorsky,
INVENTOR
BY
ATTORNEY Sept. 27, 1932.   I. SIKORSKY
AMPHIBIAN AIRCRAFT
Original Filed June 7, 1929   23 Sheets-Sheet 13
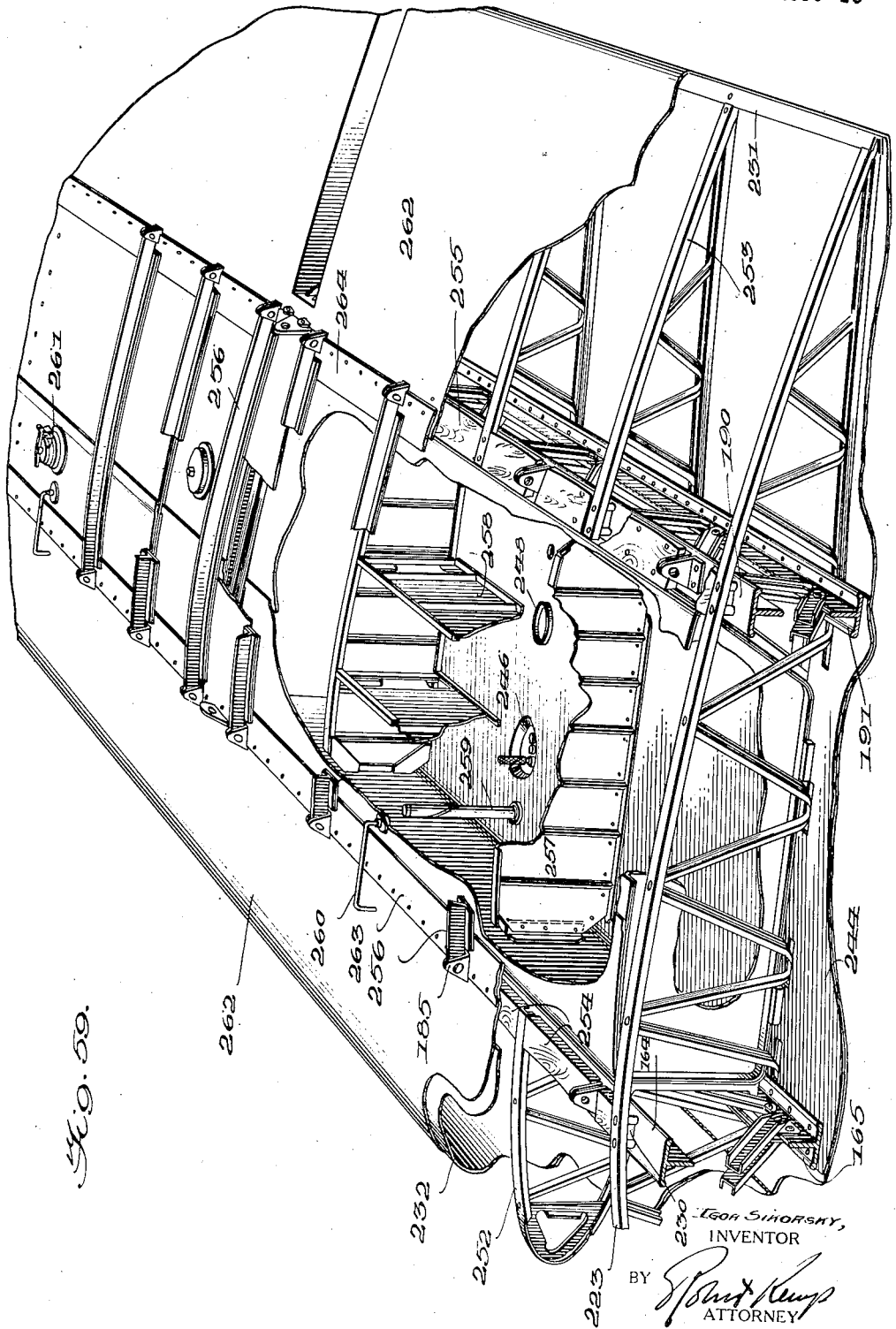

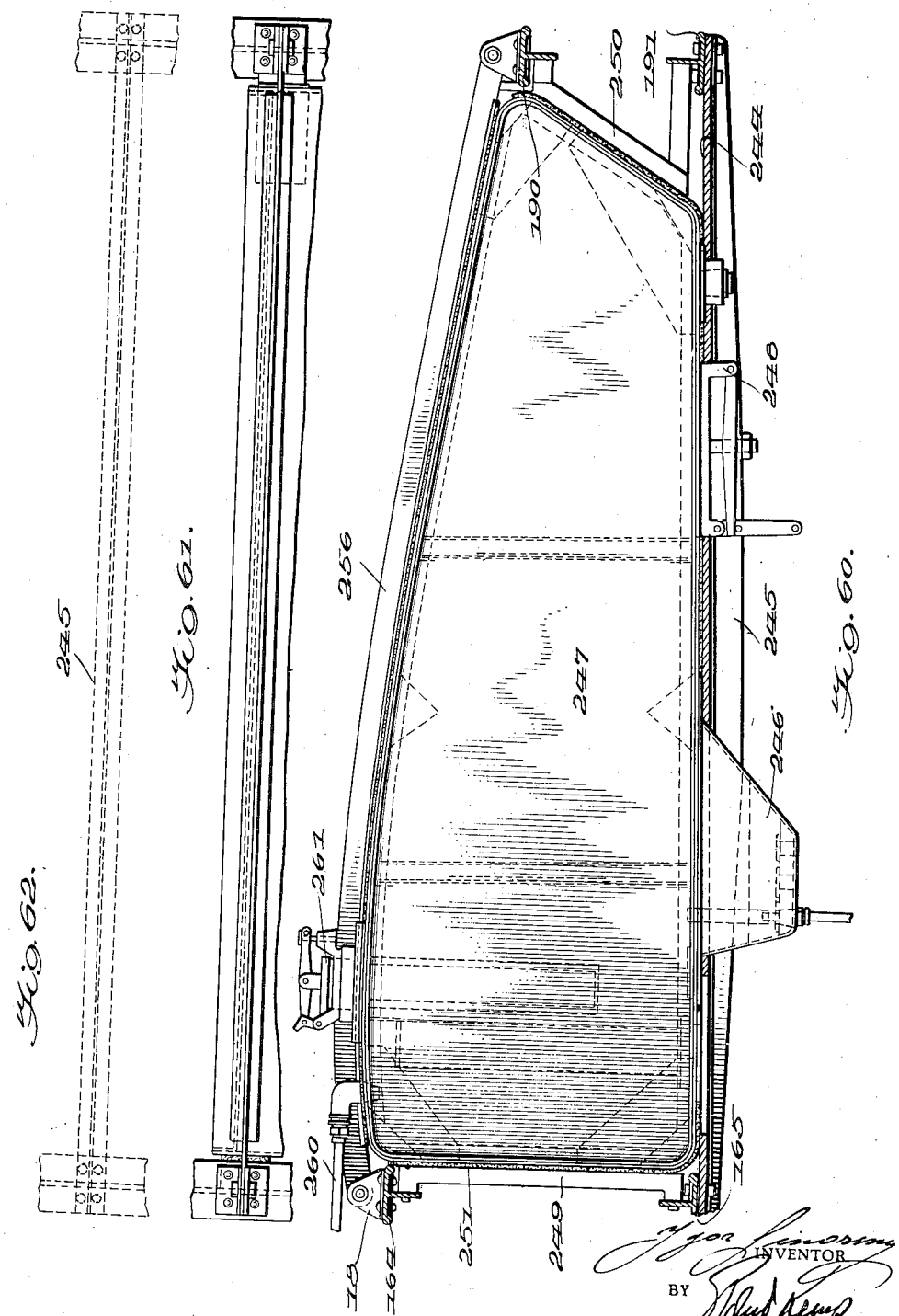

Sept. 27, 1932. I. SIKORSKY 1,879,716
AMPHIBIAN AIRCRAFT
Original Filed June 7, 1929 23 Sheets-Sheet 15

Igor Sikorsky, INVENTOR
BY ATTORNEY

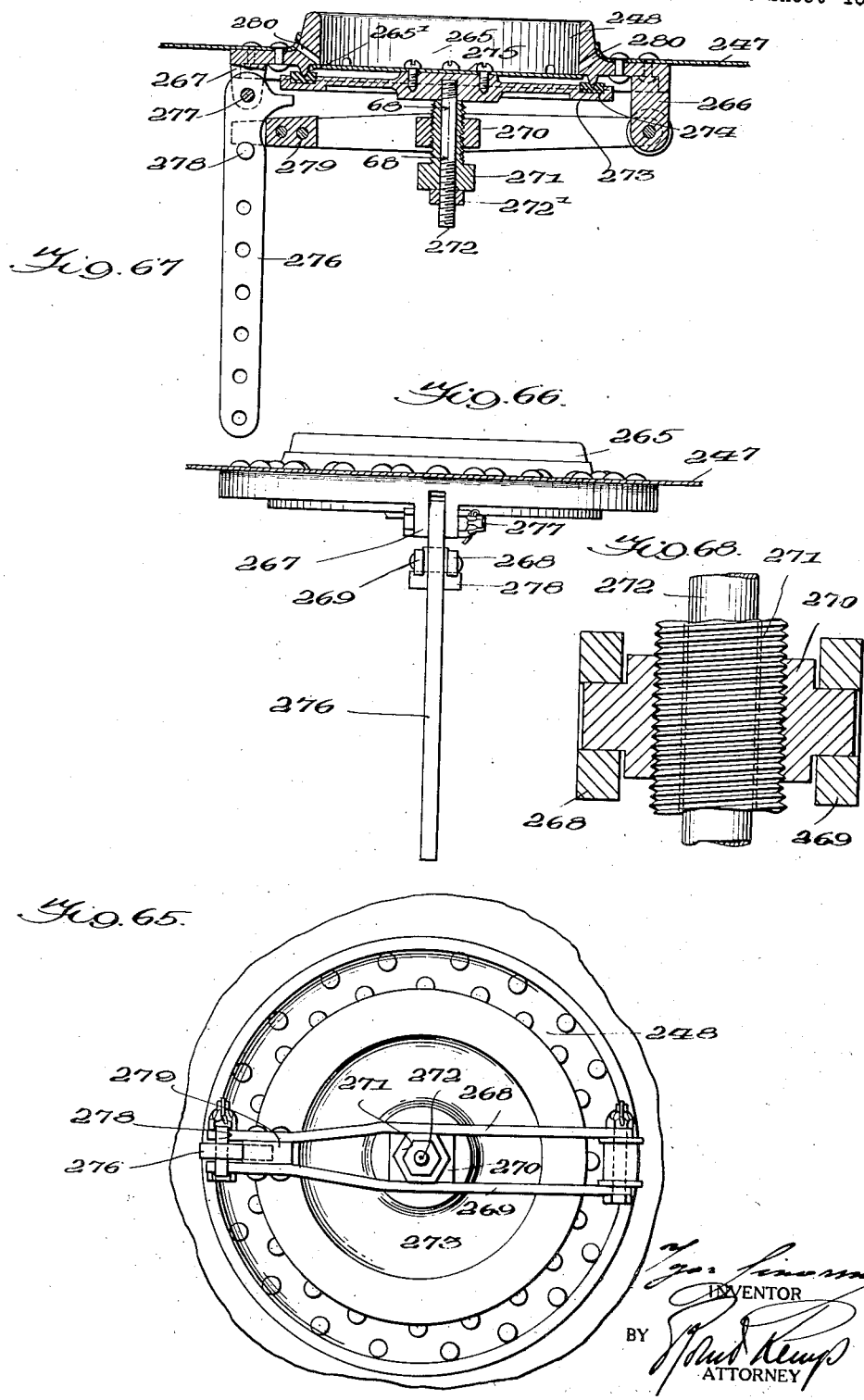

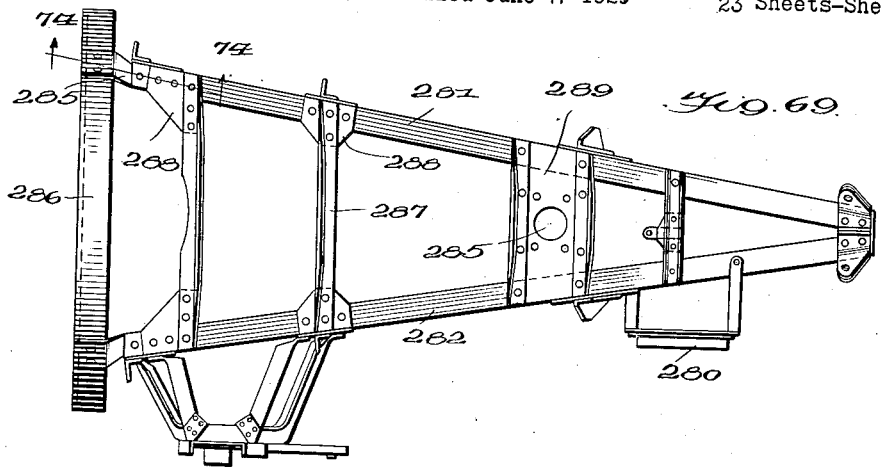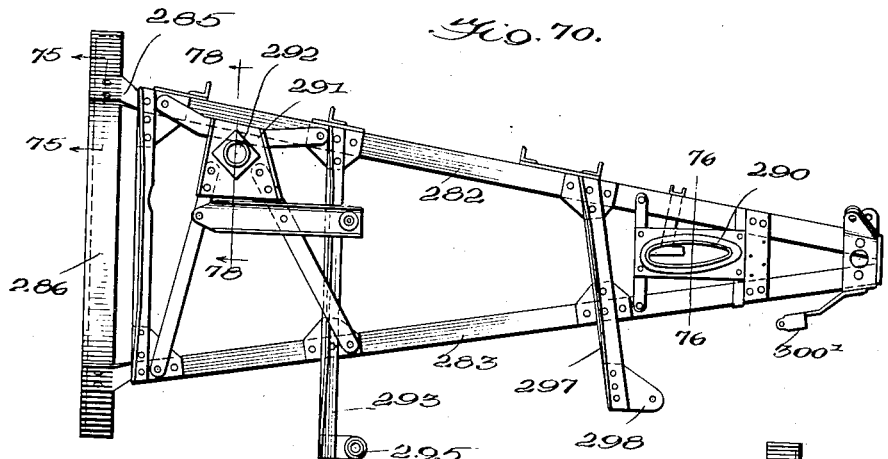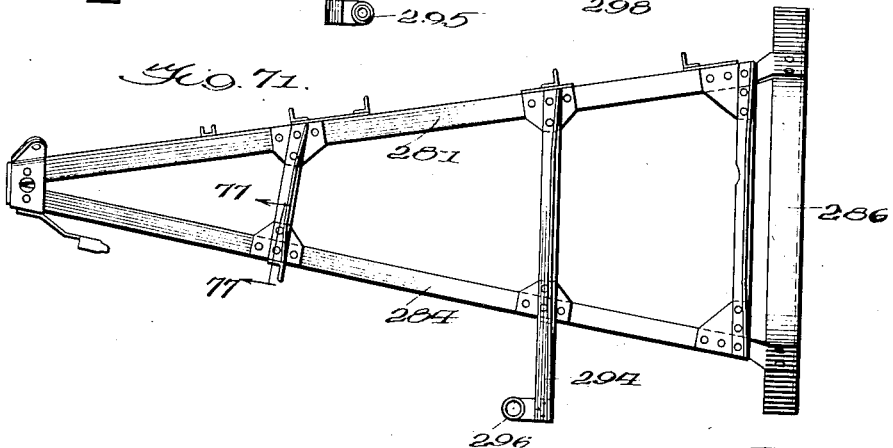

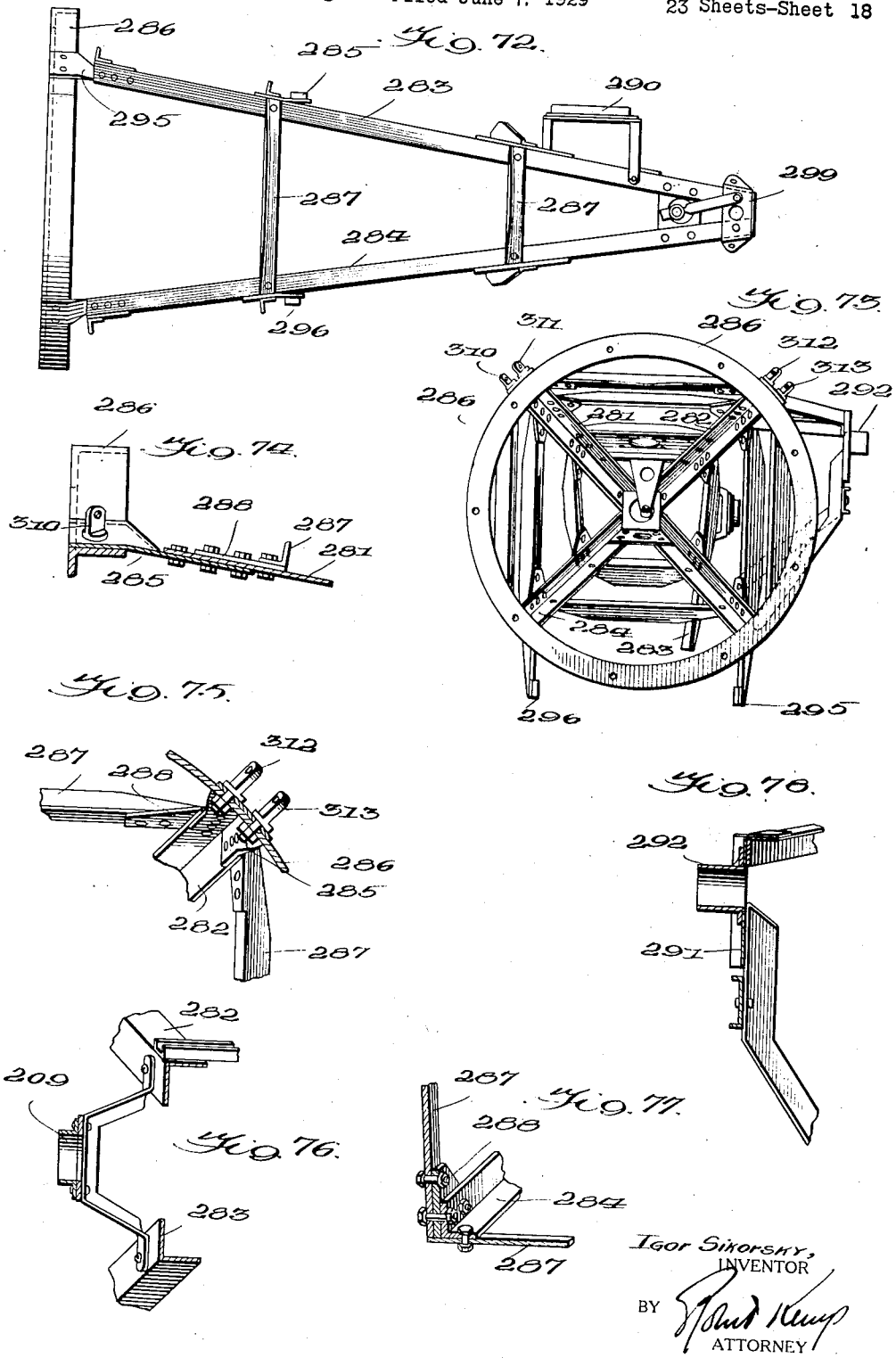

Sept. 27, 1932.  I. SIKORSKY  1,879,716
AMPHIBIAN AIRCRAFT
Original Filed June 7, 1929    23 Sheets-Sheet 19
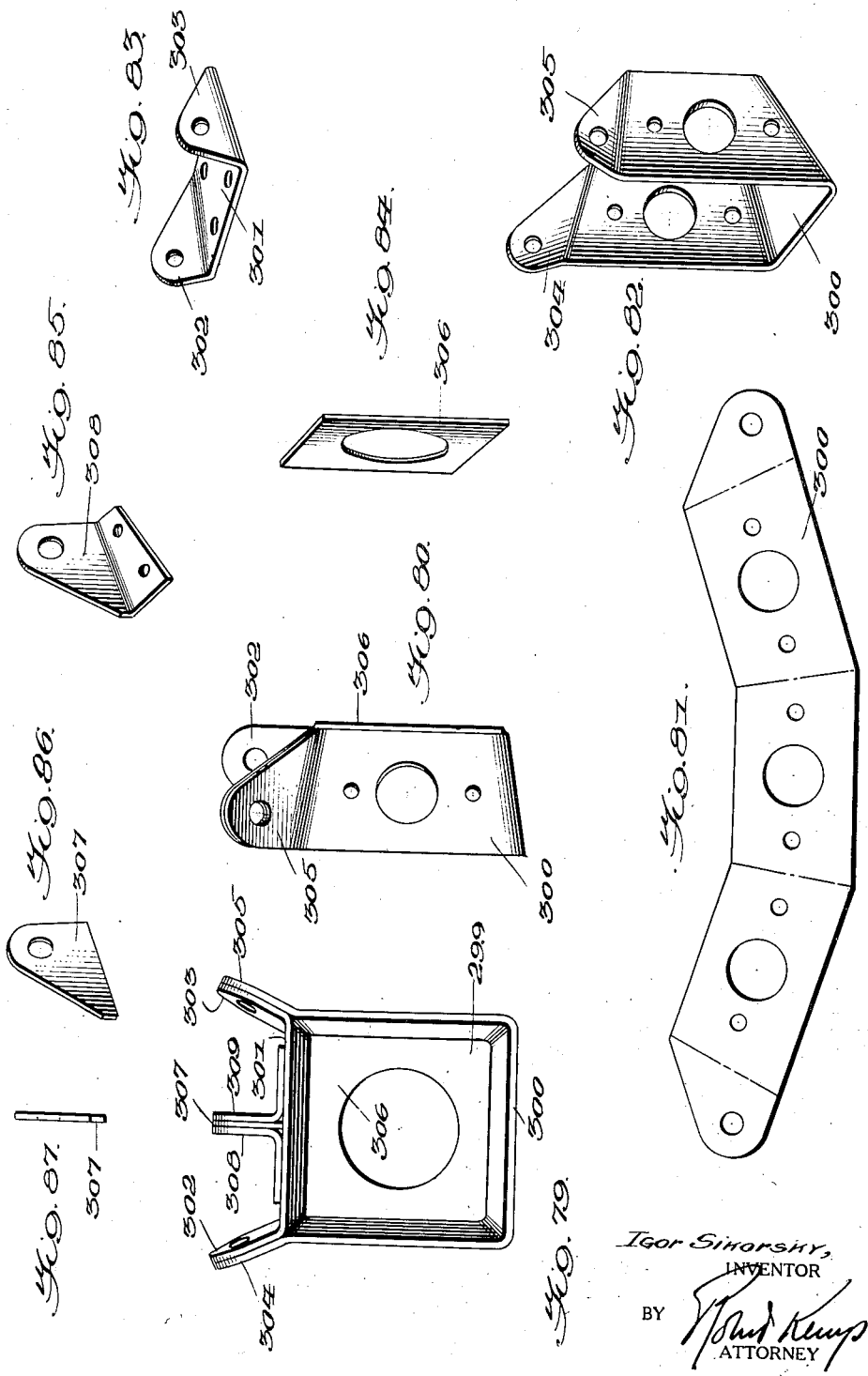

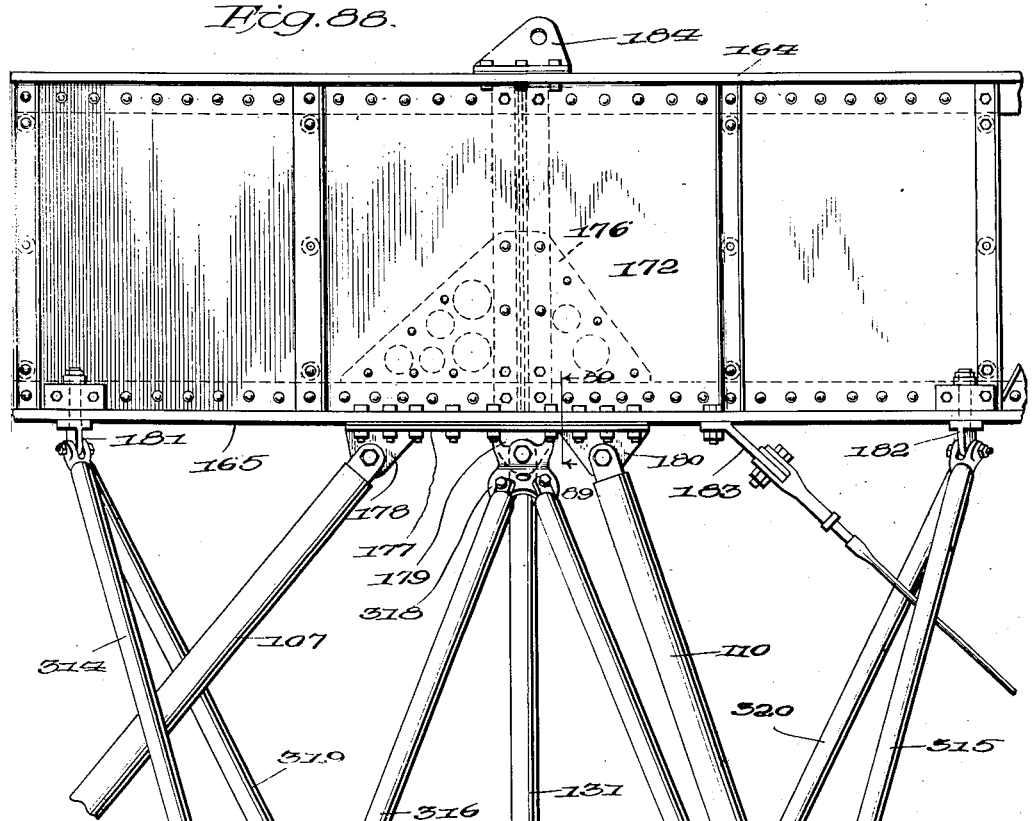

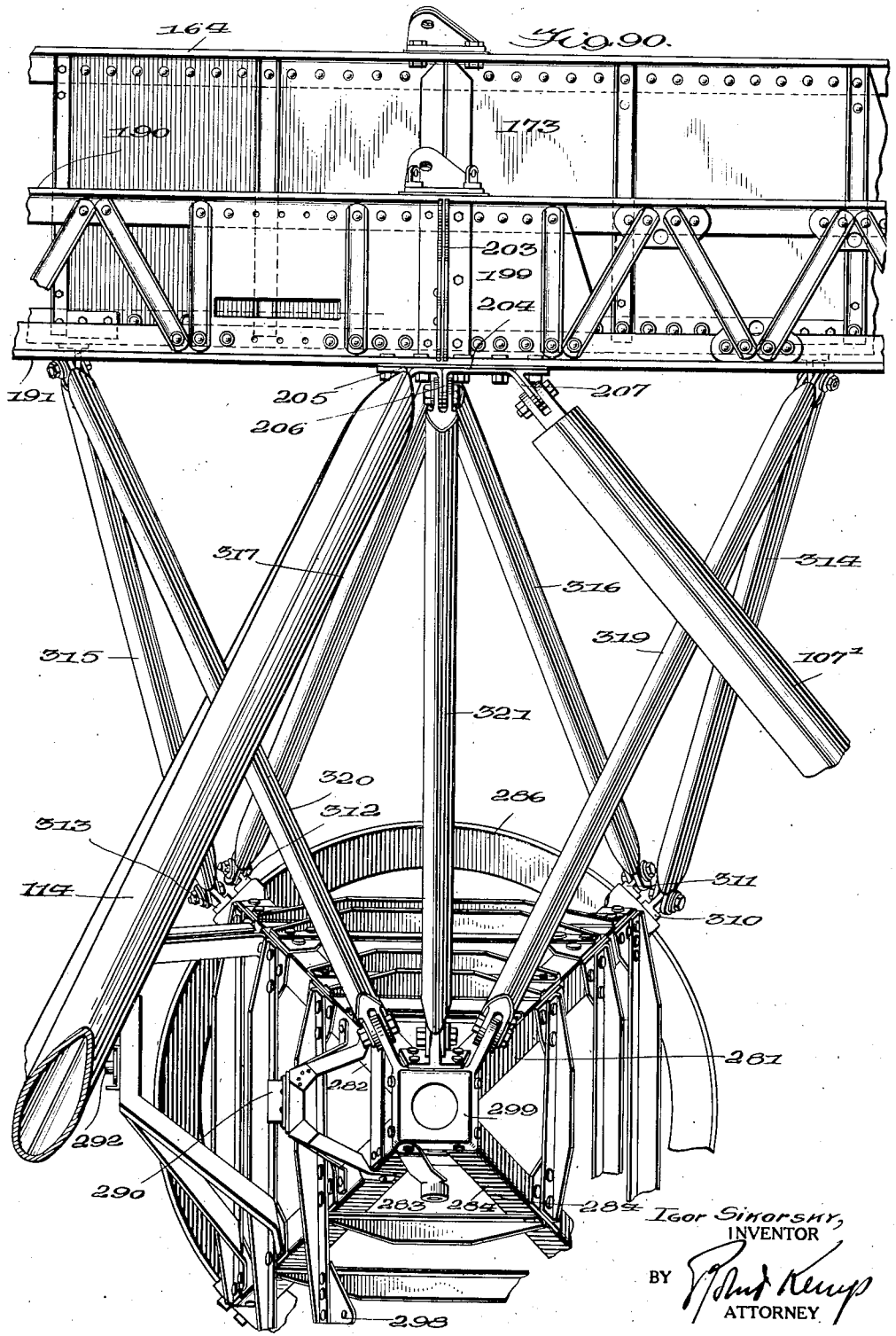

Sept. 27, 1932.    I. SIKORSKY    1,879,716
AMPHIBIAN AIRCRAFT
Original Filed June 7, 1929    23 Sheets-Sheet 22
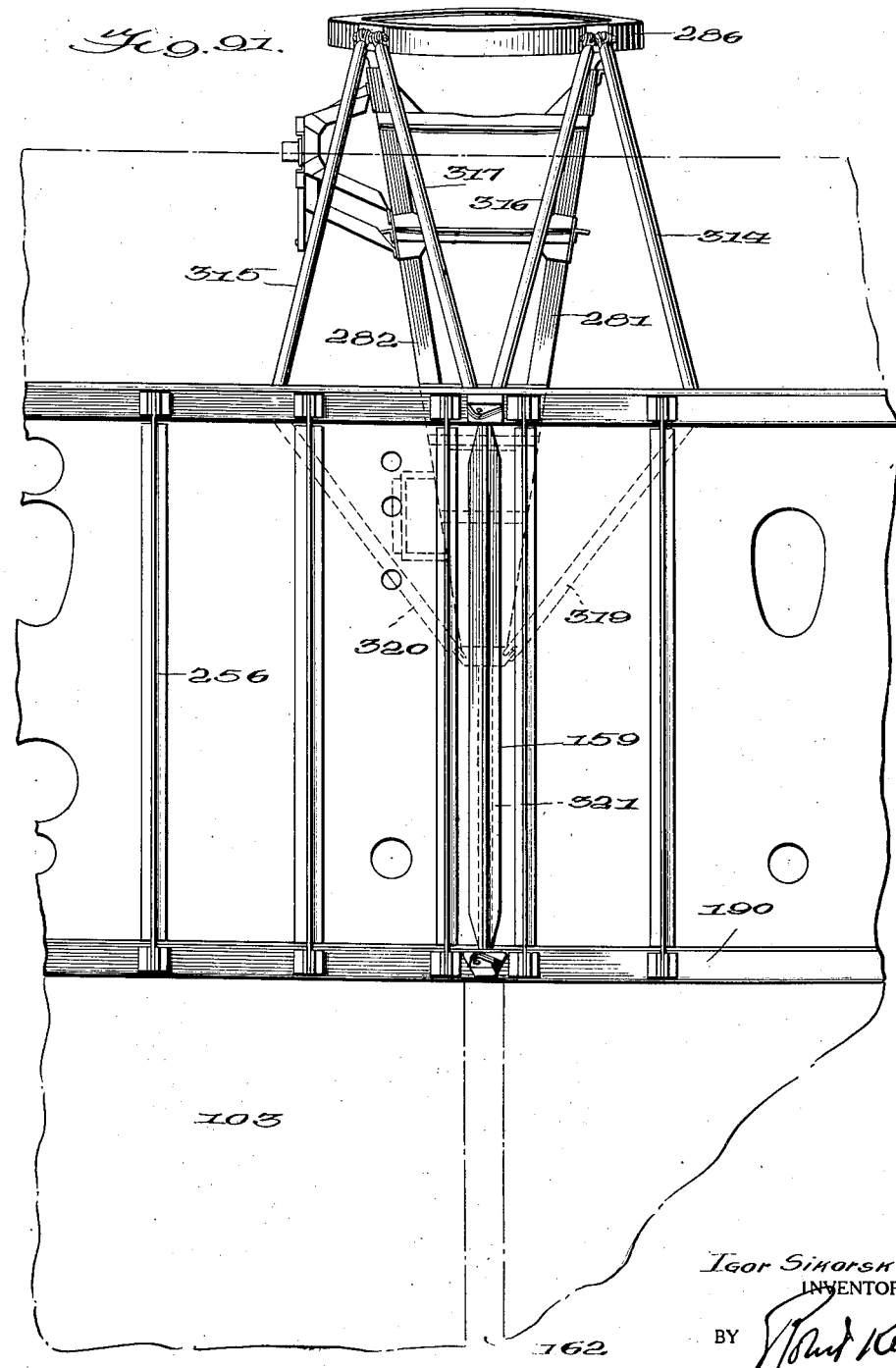

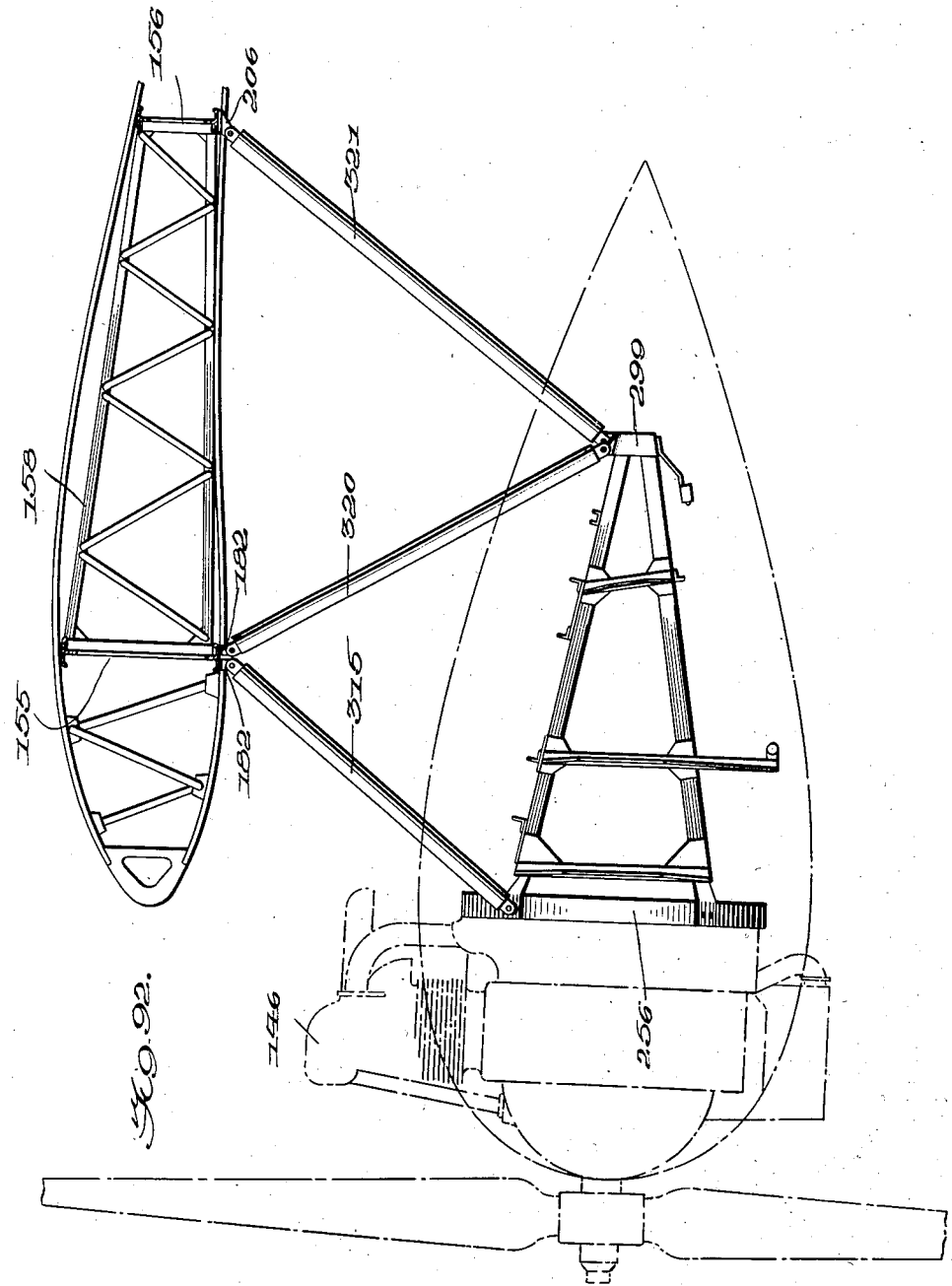

Patented Sept. 27, 1932

1,879,716

UNITED STATES PATENT OFFICE

IGOR SIKORSKY, OF COLLEGE POINT, NEW YORK, ASSIGNOR TO SIKORSKY AVIATION CORPORATION, OF WILMINGTON, DELAWARE, A CORPORATION OF DELAWARE

AMPHIBIAN AIRCRAFT

Application filed June 7, 1929, Serial No. 369,113. Renewed February 2, 1932.

The present invention relates to aircraft construction and particularly, so far as one phase of the invention is concerned to an aircraft having a main plane made up of right and left wing sections and a center section. The invention relates not only to the center section structure per se, but also to various structural combinations into which the center section enters with other adjuncts of the aircraft. As regards the center section structure per se, the invention includes a novel arrangement of fuel and oil tanks in the center section and an improved dump valve which may be applied to the tanks.

The invention also includes novel engine supporting frames and means for suspending the supporting frames below a plane of an aircraft.

While, as implied above, the invention has application to all types of aircraft, it has particular reference to multimotored amphibians, and in the accompanying drawings has been shown in connection with that type of machine. Without further reference to the general characteristics of the invention, I shall proceed to describe an embodiment thereof with reference to the drawings.

The various objects and advantages of the invention will become apparent as the description proceeds.

In the drawings:

Figure 1 is a plan view of a multi-motored amphibian.

Figure 2 is a front elevation of the same.

Figure 3 is a side elevation of the same.

Figure 4 is an isometric perspective of the amphibian with certain structural elements indicated in dotted lines.

Figure 6 is a front elevation of the central portion of the amphibian partly in section and with other parts removed or broken away for illustrative purposes.

Figure 7 is a plan view of the main plane center section.

Figure 8 is a front elevation of the front spar.

Figure 9 is an elevation of the rear spar.

Figure 10 is an enlarged view of a portion of the front spar.

Figure 11 is a section on line 11—11 of Figure 10.

Figure 12 is a section on line 12—12 of Figure 10.

Figure 13 is an enlarged view of a specially reenforced section of the front spar.

Figures 14 and 15 are perspectives of details of Figure 13.

Figure 16 is a section on line 16—16 of Figure 13.

Figure 17 is a section on line 17—17 of Figure 13.

Figure 18 is a section on line 18—18 of Figure 13.

Figure 19 is a section on line 19—19 of Figure 13.

Figure 20 is a section on line 20—20 of Figure 13.

Figure 21 is a section on line 21—21 of Figure 13.

Figure 22 is an enlarged elevation of an end of the front spar.

Figure 23 illustrates a portion of a compression member in connection with the front spar.

Figures 24 and 25 are perspectives of details of Figures 22 and 23.

Figure 26 is an enlarged view of a portion of the rear spar.

Figure 27 is a section on line 27—27 of Figure 26.

Figure 28 is a section on line 28—28 of Figure 26.

Figure 29 is an enlarged elevation of a further portion of the rear spar.

Figure 30 is a plan view of Figure 29.

Figure 31 is a section on line 31—31 of Figure 30.

Figure 32 is a section on line 32—32 of Figure 30.

Figure 33 is an enlarged elevation of a still further portion of the rear spar.

Figure 34 is a section on line 34—34 of Figure 33.

Figure 35 is a section on line 35—35 of Figure 33.

Figure 36 is a section on line 36—36 of Figure 33.

Figure 37 is a perspective of a detail of Figure 33.

Figure 38 is an enlarged view of the end portion of the front spar at the right of Figure 8 as seen from the rear.

Figure 39 is an elevation of the upper left hand portion of Figure 38 as seen from the left of that figure.

Figure 40 is a section on line 40—40 of Figure 38.

Figure 41 is a section on line 41—41 of Figure 38.

Figure 42 is a section on line 42—42 of Figure 38.

Figure 43 is a section on line 43—43 of Figure 38.

Figure 44 is an elevation of the main plane center section as seen from the right of Figure 7.

Figure 45 is a section through the center section showing a wing rib in elevation.

Figure 46 is an elevation of a portion of the center section framework involving ribs such as illustrated in Figure 45.

Figure 47 is a section on line 47—47 of Figure 48.

Figure 48 is a section on line 48—48 of Figure 47.

Figure 49 is a section on line 49—49 of Figure 48.

Figure 50 is a section taken transversely of a top spar element and longitudinally of a portion of an associated rib.

Figure 51 is a section on line 51—51 of Figure 50.

Figure 52 is a longitudinal vertical section of a rib tip.

Figure 53 is a plan view of the same.

Figure 54 is a section on line 54—54 of Figure 52.

Figure 55 is a side elevation of a rib nose.

Figure 56 is a plan view of Figure 55.

Figure 57 is a section on line 57—57 of Figure 55.

Figure 58 is a front elevation of the central portion showing the tank arrangement and connections.

Figure 59 is a perspective of a portion of the center section with parts broken away.

Figure 60 is a section through the center section adjacent the end of one of the tanks.

Figure 61 is a plan view of a portion of the center section,

Figure 62 being a similar plan view showing in dotted lines certain structural elements underlying those shown in Figure 61.

Figure 63:
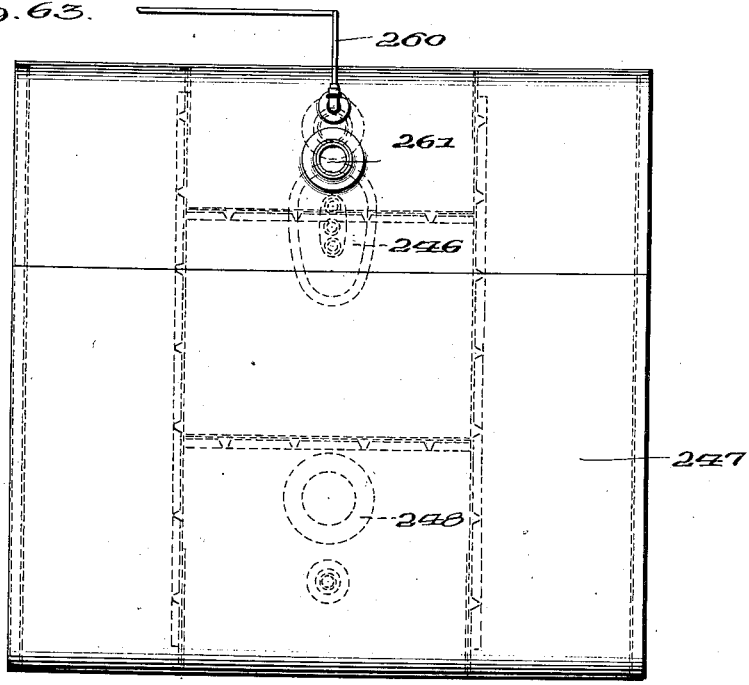

Figure 63 is a plan view of the fuel tank.

Figure 64:
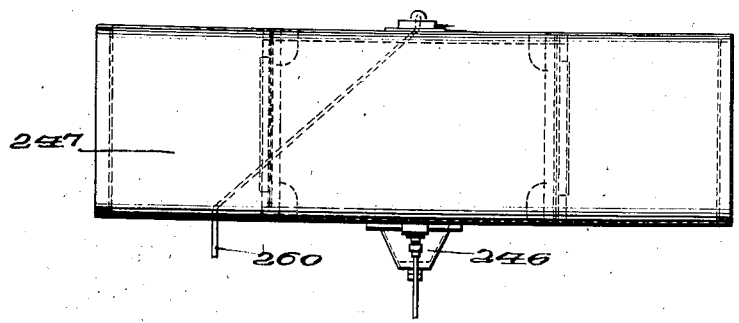

Figure 64 is an elevation of the tank of Figure 63.

Figure 65 is a bottom plan view of a fuel dump valve.

Figure 66 is an elevation of the valve.

Figure 67 is a section of the valve.

Figure 68 is a section on line 68—68 of Figure 67.

Figure 69 is a plan view of an engine supporting frame.

Figure 70 is an elevation of the frame.

Figure 71 is a further elevation of the frame.

Figure 72 is a bottom plan view of the frame.

Figure 73 is a front view of the frame.

Figure 74 is a section on line 74—74 of Figure 69.

Figure 75 is a section on line 75—75 of Figure 70.

Figure 76 is a section on line 76—76 of Figure 70.

Figure 77 is a section on line 77—77 of Figure 71.

Figure 78 is a section on line 78—78 of Figure 70.

Figure 79 is an elevation of a box constituting a portion of the engine frame structure.

Figure 80 is an elevation of the box.

Figure 81 is a plan view of a blank entering into the box structure.

Figure 82 is a perspective showing the blank of Figure 81 bent into final form.

Figures 83 to 86 are perspectives of other elements entering into the box structure.

Figure 87 is an end view of the element shown in Figure 86.

Figure 88 is an elevation of an engine supporting frame and its connections with a portion of the center section front spar.

Figure 89 is a section on line 89—89 of Figure 88.

Figure 90 is a rear elevation of an engine supporting frame and the connections between it and the rear end front spars of the center section.

Figure 91 is a plan view of a portion of the center section and a motor support, and Figure 92 is a section of the center section showing in elevation a motor supporting frame and motor with the suspension members as interposed between the center section and the supporting frame.

Reference numeral 100 designates the body-boat of the amphibian which is supported beneath a main plane comprising right and left wings 101 and 102 and a center section 103. Lower wings 104 and 105 project laterally of the body-boat beneath the upper or main plane. The planes are mutually supported by means of interplane struts 106, 106′, 107, 107′, 108, 108′ and 109 and 109′. Further, front struts 110 and 111 are interposed between the main plane and the body-boat. Struts 112 and 113 are interposed between the lower wings and the rear portion of the body-boat and struts 114 and 115 are interposed between the upper wings and the rear portion of the body-boat.

Outriggers 116 and 117 project rearwardly of the main plane center section and support at their rear ends an empennage assembly designated as a whole by the numeral 118, the rear portions of the outriggers being supported from the rear extremity of the body-boat by means of struts 119 and 120.

Wing pontoons 121 and 122 suspended below the outer portions of wings 104 and 105 are adapted to cooperate with the body-boat when the machine is brought to rest on water. When the machine is to be landed on the ground, landing wheels 123 and 124 may be moved from the dotted line positions indicated in Figures 2 and 6 to the full line positions. A tail skid is mounted at 100'.

Referring to Figure 6 it will be noted that wheels 123 and 124 are mounted on axles 125 and 126 pivoted to the body-boat for oscillation in vertical planes. To the outer ends of the axles are pivoted rods 127 and 128 which at their upper ends are provided with pistons working in elongated cylinders and guide members 129 and 130, these latter being pivoted at their upper ends to rods 131 and 132 which are fixed in the vertical positions shown. A pump 133 in connection with a source of liquid, not shown, is adapted to supply liquid under pressure to lines 134, 135, 136 and 137.

Lines 134 and 135 lead respectively to the bottom and top of cylinder 129 and lines 136 and 137 to the top and bottom of cylinder 130. By suitable manipulation of valve handles 138 and 139, in conjunction with the operation of pump 133, liquid under pressure may be admitted to one side or the other of the pistons in cylinders 129 and 130, thereby either projecting or retracting rods 127 and 128 simultaneously or separately. Since this landing wheel control system has been fully described and claimed in my copending applications Serial No. 314,585 filed October 24, 1928 and Serial No. 354,552 filed April 12, 1929, further description is not necessary here. It may be pointed out, however, that tubes 134 to 137 are conducted upwardly through a streamline conduit 140 and through horizontal streamline conduits 141 and 142 which terminate adjacent the lower ends of members 131 and 132. A further vertical streamline conduit 143 serves to house the empennage control cables and the control cables for ailerons 144 and 145.

Figure 5:
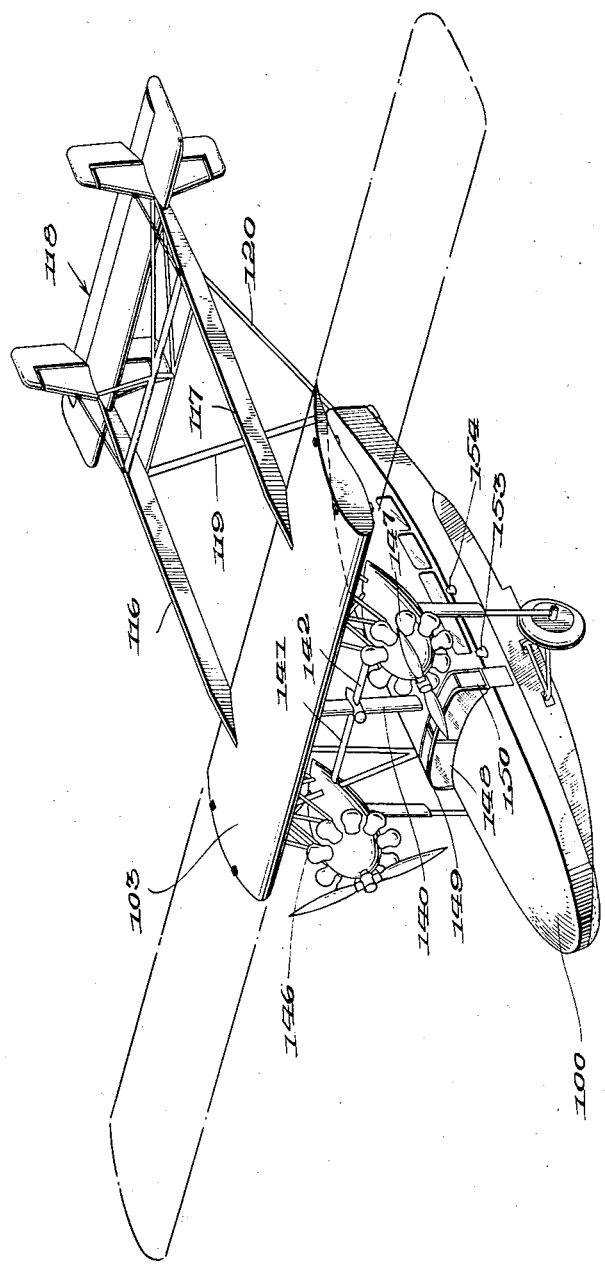
Figure 5 is an isometric perspective of the amphibian exclusive of the right and left hand upper wings and the lower wings.

In Figure 5 the relative arrangement of the main plane center section, body-boat, motors, landing wheels and outriggers has been clearly shown. A plurality of motors are contemplated and two are shown at 146 and 147. It will be noted that the main plane center section 103 is symmetrically disposed relative to the longitudinal axis of the body-boat. The pilots' compartment in the body-boat extends somewhat forwardly of both wings and is provided with forward windows 148, a top window 149 and a side window as at 150. In as much as the landing wheels and motors are disposed somewhat in advance of the planes, it will be obvious that they are well within view of the pilots, of which there will ordinarily be two seated side by side, chairs 151 and 152, Figure 6, being provided.

The principal point which it is desired to make in connection with Figure 5 is that of the localization of the main stresses to the center section and to certain localized portions of the latter. It will be noted that the two engines are suspended beneath the center section in symmetrical relation to the longitudinal axis of the body-boat. Outriggers 116 and 117 project rearwardly of the center section in the vertical axial planes of the motors and the compression members interposed between the wheels and the center section lie, when the wheels are in operative position, substantially in these same vertical planes. The motors are suspended by means of members connected to front and rear spars of the center section and compression members are interposed between these spars in alignment with the outriggers. This localization of stresses makes it possible to especially reinforce the front and rear spars at only localized portions, leaving them elsewhere of desirable lightness. Furthermore, as will be later described, the fuel and oil tanks are disposed in a novel manner in the main plane center section. In Figure 5 means for connecting the lower left wing to the body-boat have been shown at 153 and 154.

In Figure 7 the main plane center section 103 is shown as including front and rear spars 155 and 156 and compression members 157 to 161. In alignment with compression members 158 and 160 the trailing portion of the plane is provided with slight discontinuations 162 and 163 to receive the forward ends of the outriggers.

The front spar 155, Figure 8, comprises upper and lower bulb-flanged T-bars 164 and 165 interconnected by means of truss-members 166. As is shown in Figures 10 to 12 each truss unit is preferably composed of a pair of U-members 167 and 168 in back to back arrangement, these being secured to the upper and lower bars 164 and 165 through the intermediary of a pair of plates 169 and 170, there being a spacer 171 between the intermediate portions of the members. At certain localized portions, however, the spar is especially reenforced by means of a pair of plates 172 and 173, one of which is disposed at each side of the webs of members 164 and 165 and riveted therethrough. Vertical strengthening members as 174 and 175 likewise interconnect the webs of bars 164 and 165, while at the point of connection of compression members 158, a triangular plate 176 is interposed between plates 172 and 173.

Immediately below plate 176 an attachment member 177 is secured to member 165, member 177 having three eyeleted portions 178, 179 and 180. Eye-bolts 181 and 182 serve as anchoring means for the upper ends of engine support suspension members and member 183 serves as anchoring means for a flying wire. Bracket 184 is a cable attachment member for use when the machine is to be hoisted by external means, while attachment brackets 185 serve as securing means for transverse plane members to be hereinafter described.

Figures 22 and 23 show the end of the front spar at the right of Figure 8, the spar at its upper and lower extremities being provided with external blocks 186 and 187 to which similar blocks of the contiguous wing may be secured. Forwardly projecting plates 188 and 189 are secured between blocks 186 and 187 and bars 164 and 165 for a purpose which will later appear.

The rear spar 156, Figure 9, comprises upper and lower bulb-flanged T-bars 190 and 191 interconnected by means of strut units comprising a pair of back to back U-members 192 and 193.

Adjacent the center portion of the spar, it is provided with rearwardly projecting upper and lower brackets 194 and 195 supporting vertically aligned ball-bearings in which are journalled bell crank levers included in the aileron control. Outwardly of the brackets 194 and 195, the rear spar has secured thereto a further set of rearwardly projecting brackets 196 and 197 likewise supporting vertically aligned ball bearings in which are journalled further bell crank levers associated with the aileron controls.

The front spar, it will be noted, has two specially reenforced portions as particularly described in connection with Figures 13 to 21. The rear spar has two such reenforced portions immediately to the rear of the reenforced portions of the front spar.

Referring to Figures 33 to 35 a pair of plates 198 and 199 are riveted to the vertical webs of members 190 and 191, these being reenforced by vertical members as at 200. Compression member 160 is secured to this reenforced portion of the rear spar between a pair of vertical L-bars 201 and 202, immediately to the rear of which are attachment means 203 for outriggers 117. Beneath the L-bars, an attachment member 204 is secured to the lower bar 191, this attachment member having three eyeleted portions 205, 206 and 207. A handling bracket 208, similar to 184 above described, is secured to bar 190. Connecting blocks 209, 210, 211 and 212 are secured to the extremities of spar 156.

The left hand end rear portion of the front spar is particularly clearly shown in Figure 28. In connection with the foregoing description of the front spar it is only necessary to state further that reference numerals 213 and 214 designate L-bars interposed between members 164 and 168 and constituting the forward end of the frame of compression member 161.

Figure 44 is a view similar to Figure 38, but brings in the manner of connecting compression member 161 with the rear spar. The rear end of the compression member comprises a pair of L-bars similar to L-bars 213 and 214 secured at their ends to the webs of members 190 and 191. The longitudinal members of the compression member are interconnected by means of truss units 215 similar to the truss units employed between the top and bottom members of the spars. Plate 188, mentioned in connection with Figures 23 and 25 projects forwardly of bar 164 in alignment with compression member 161. A similar plate projects forwardly of block 187 and similar plates also project rearwardly of blocks 211 and 212. To the forwardly extending plates are secured the rear extremities of upper and lower contour strips 216 and 217 which together with a nose piece 218, Figure 55, constitute a nose frame of aerofoil section. Contour strips 219 and 220 constitute the upper and lower elements of a tail frame. The upper and lower members of compression member 161 have rectilinear upper and lower faces which are modified by means of contour pieces 221 and 222 to form a rib section intermediate the nose and tail sections above described. It will be understood that a similar structure is present at each end of the center section.

Intermediate portions of the center section require continuous ribs such as are indicated as a whole at 223, Figure 45, these constituting upper and lower contour members 224 and 225 and a nose plate 218. This latter as is indicated particularly in Figures 55 to 57 has a forward curvilinear portion with its margins 226 dished in one direction and a rear vertical edge provided with a flange 227 bent in the opposite direction. The rearward portion of the curvilinear section is inwardly stepped to receive the U-section upper and lower contour strips in flush relation with its forward portion.

The upper and lower contour strips are interconnected by means of U-section truss members 228 whose ends are connected to the vertical flanges of connectors 229 having feet riveted in the channels of the contour members. The ribs are secured to the spars through spacer blocks 230, Figures 50 and 51. The rear ends of all the rib members are connected by a V-section binding strip 231, while the nose portions of all the rib members are enclosed in a nose box 232.

As indicated in Figure 58, a number of fuel tanks 233 to 236 and oil tanks 237 and 238 are disposed in the center section 103 intermediate the compression members and between the spar members. The fuel tanks are connected by means of pipes 239 to 242 with a common conduit 243 which is disposed in the streamline housings 141 and 142 which have been above described. It will be noted that the fuel tanks are spaced along the center section in symmetrical relation to the longitudinal axis of the body-boat. Due to the arrangement of the common conduit 243, which at each end is adapted to be connected to a motor supply line, even discharge from the tanks and thus constant balance is assured.

In Figures 59 to 64 I have shown the arrangement of the tanks relative to the plane. Bars 165 and 191 of the front and rear spars are connected by means of a metal plate 244 riveted to their undersurfaces and reenforced by means of transverse strips 245, Figures 60 and 62, plate 244 being appropriately apertured to receive a draw-off well 246 projecting from the lower wall of tank 247 and a dump valve 248 likewise projecting therebelow. The forward wall of tank 247 is substantially vertical while the rear wall is upwardly and rearwardly inclined. The tank as a whole rests on the plate 244, while its forward wall bears against wooden chocks 249 secured to the webs of members 164 and 165. The rear wall of the tank rests against appropriately formed chock members 250, cushioning means 251 being interposed between the tank and all of its supporting and guiding members. The top of the tank is of substantially aerofoil contour, the contour being completed by nose members 252 and tail members 253 secured respectively to the front and rear spars and spaced by means of wooden filler blocks 254 and 255. Extending across the top of the tank and secured at their forward ends to elements 185 and at their rear ends to similar elements on the tail spar, are external structural members 256.

Interiorly, the tanks are provided with vertical baffles as at 257 and 258, these being designed to prevent surging of the liquid from one portion of the tanks to another. Reference numeral 259 indicates a gauge operating element, 260 indicates a vapor escape tube and 261 a filling opening provided with a closure cap. It will be noted that in that portion of the center section occupied by the tanks, the wing covering 262 extends beneath and over the plane to blocks 254 and 255 to which it is secured through reenforcing strips 263 and 264.

The dump valve 248 has been particularly shown in Figures 65 to 68. This valve comprises a ring 265 secured in the bottom wall of tank 247, the ring having integral therewith externally of the tank a downwardly projecting lug 266 and a pair of knuckles diametrically opposite the lug. An arm consisting of a pair of bars 268 and 269 is pivoted at one end to lug 266 for vertical swinging movement in the diametrical plane of the lug and knuckles 267. At an intermediate point the arms have swiveled therebetween a block 270 in an aperture of which is threaded a cap-screw 271 having a hollow bore. A spindle 272 passes through this hollow bore and supports a circular closure member 273 supporting in a suitable seat a gasket 274 which is adapted to cooperate with a tapered flange 265′ of ring 265. Mounted on a central boss of closure member 273 is a closure plate 275 cooperating with margins of ring 265 inwardly of flange 265′.

A lever 276 is pivoted between knuckles 267 by means of a bolt 277. Lever 276 is provided with a pin 278 over which the distal ends of bars 268 and 269, which adjacent these ends are connected together through a spacer block 279, are adapted to take when the lever is in substantially vertical depending position. Under these circumstances the lower mouth of the ring is closed by means of members 273 and 275, these latter being properly adjustable through the intermediary of screw 271. The lower end of spindle 272, it will be noted, has a nut 272′ screwed thereon in engagement with the head of the cap screw. When in case of emergency it is desired to dump the contents of tank 247 it is merely necessary to trip lever 276, that is to move it sufficiently to the left so that pin 278 will release the ends of bars 268 and 269 whereupon the closure means will fall entirely away from ring 265, thereby permitting the escape of the tank contents. In order that the tank may be entirely drained, oblique passages 280 are provided in ring 265, these debouching upwardly at substantially the inner level of the tank bottom.

The motor supporting frames and their particular manner of suspension from the main plane center section have been particularly illustrated in Figures 69 to 92. Referring to these figures it will be seen that each frame comprises four angle bars 281, 282, 283 and 284 in substantially pyramidal formation, these bars supporting at their divergent ends through connector strips such as 285, a ring 286. Ring 286 may be in the nature of a single flanged forging or it may be composed of ann L-bar bent into a circle and its abutting ends welded together. The mounting member 286 is adapted to have directly bolted thereto a radial motor, although the ring would be suitable for the attachment of a rotary motor, as will be understood. Bars 281 and 284 are secured together by means of transverse angle bars as at 287 through the intermediary of bracing plates as at 288. Also members 281 and 282 are joined by means of a reenforced plate 289 having an aperture 289′ therein adapted to receive and guide the lower end of member 131.

Members 282 and 283 support adjacent their rear ends a collar 290 to which is coupled the outer end of streamline conduit 141. These members also support a plate 291 carrying a bushing or bearing 292 through which the starting crank extends inwardly to an inertia starter for starting the engine. Parallel downwardly projecting arms 293 and 294 have bearings 295 and 296 fixed to their lower ends, these bearings being adapted to receive a shaft upon which is mounted certain engine control instrumentalities. A downwardly projecting member 297 has secured to its lower extremity a bracket 298 adapted to support the gasoline strainer.

The rear ends of bars 281 to 284 are secured in a box 299. This box is formed on three sides from a blank 300 Figure 81, bent to the form shown in Figure 82. The fourth side of the box is formed by a plate 301 having ears 302 and 303 welded to ears 304 and 305 of strip 300. The sides it will be noted diverge along the lines of bars 281 to 284, their convergent edges being joined by a perforate plate 306 welded thereto. Intermediate the ears of plate 301 is an upright ear 307 rigidly secured to angle brackets 308 and 309 whose foot portions are welded to plate 301. A pipe line support 300' is secured to the box wall opposite plate 301. The rear extremities of bars 281 to 284 are riveted in the corners of box 299, the latter being positioned so that its ears are at its upper side.

In line with the forward extremities of bars 281 and 282, ring 286 is provided with radially extending eye-bolts 310, 311, 312 and 313. Eye-bolts 310 and 313 are connected to the lower ends of struts 314 and 315 which at their upper ends are connected to eye-bolts 181 and 182. Eye-bolts 311 and 312 are connected to the lower ends of struts 317, which at their upper ends are secured to a plate 318 bolted to tongue 179 of the connector member 177, the upper end of member 131 being likewise secured to tongue 179. The lower ends of struts 314 to 317 project forwardly of front spar 164 so that the engine will be disposed somewhat in advance of the latter, the engine supporting frame projecting both forwardly and rearwardly of the same. It will also be noted that the suspension members when viewed from the front, as in Figure 88 are arranged in substantially the form of a W, and their upper ends are all secured to the front spar at a specially reenforced section of the latter. Struts 319 and 320 connect ears 302—304 and 303—305 of box 299 with the rear eye-bolts 181, 182 of the front spar to retain the motor supporting frame in a position in which its axis extends substantially parallel to the axis of the body-boat. Ears 307—308—309 of box 299 are connected by means of the member 321 with anchor member 206 of the rear spar. The supporting members for the engine mounting as thus disposed are in substantially N-formation when seen from the side as in Figure 92. The suspension system as a whole gives the greatest possible stability against laterally and fore and aft distortive forces.

From Figure 90 it will be noted that the upper ends of struts 107' and 114 are secured respectively to portions 207 and 205 of connector member 204, this member having been described above in connection with Figures 33 and 37.

While I have described an embodiment of my invention with particularity in order that it may be practiced by those skilled in the art, it is to be understood that I do not limit myself except as determined in the following claims.

I claim:

1. In an amphibian aircraft, a body member, fluid pressure actuated retractable landing gear mounted on said body member, a main plane center section above said body member in symmetrical relation to the longitudinal axis of said body member, struts interconnecting the center section and body member, a plurality of motors mounted beneath the center section in symmetrical relation thereto, and a plurality of empennage-supporting outriggers projecting rearwardly of said section.

2. In an amphibian aircraft, a body member, fluid pressure actuated retractable landing gear mounted on said body member, a main plane center section above said body member in symmetrical relation to the longitudinal axis of said body member, struts interconnecting the center section and body member, a plurality of motors mounted beneath the center section in symmetrical relation thereto, and an empennage-supporting outrigger projecting rearwardly of said section in the vertical axial plane of each of said motors.

3. In an amphibian aircraft, a body boat member, a main plane center section above said body boat member in symmetrical relation to the longitudinal axis of said body member, struts interconnecting the center section and body member, a plurality of motors mounted beneath the center section in symmetrical relation thereto, landing wheels and fluid pressure actuated telescopic retractable compression members interposed between each of said wheels and the center section.

4. In an amphibian aircraft, a body boat member, a main plane center section above said body boat member in symmetrical relation to the longitudinal axis of said body member, struts interconnecting the center section and body member, a plurality of motors suspended from the center section in symmetrical relation thereto, landing wheels and a fluid pressure actuated telescopic retractable compression member interposed between one of said wheels and a point of suspension of one of the motors.

5. In an amphibian aircraft, a body boat member, a main plane center section above said body boat member in symmetrical relation to the longitudinal axis of said body boat member, struts interconnecting the center section and body boat member, a plurality of motors suspended from the center section in symmetrical relation thereto, landing wheels, and a fluid pressure actuated telescopic retractable compression member interposed between each of said wheels and a point of suspension of each of the motors, each compression member lying substantially in the vertical axial plane of a motor.

6. In an amphibian aircraft, a body boat member, a main plane center section above said body boat member in symmetrical relation to the longitudinal axis of said body boat member, struts interconnecting said center section and body boat member, a plurality of motors mounted on the center section in symmetrical relation thereto, an empennage supporting outrigger projecting rearwardly of said section in the vertical axial plane of each motor, landing wheels, and a fluid pressure actuated retractable telescopic compression member interposed between each of said wheels and said section, and lying substantially in the vertical axial plane of each motor.

7. In an amphibian aircraft, a main plane center section including a front spar comprising upper and lower T bars with interconnecting truss member, a localized portion of said spar being specially reenforced, motor mounting means at said reenforced portion, and connecting means for a fluid pressure actuated retractable landing wheel compression member at said portion.

8. In an amphibian aircraft, a main plane center section including a front spar comprising upper and lower bars with interconnecting truss members, a localized portion of said spar being specially reenforced by means of plate interconnecting the bars, motor suspension means at said reenforced portion, and connecting means for a fluid pressure actuated retractable landing wheel compression member at said portion.

9. In an amphibian aircraft, a main plane center section including front and rear spars each comprising upper and lower bulbed flanged T bars with interconnecting truss members, a localized portion of each of said spars being specially reenforced, motor mounting means at said reenforced portions, and connecting means for a fluid pressure actuated telescopic retractible landing wheel compression member at said reenforced portion of the front spar.

10. In an amphibian aircraft, a main plane center section including front and rear spars each comprising upper and lower T bars with interconnecting truss members, a localized portion of each of said spars being specially reenforced, motor suspension means at said reenforced portions, a compression member interposed between said portions, and connecting means for a fluid pressure actuated telescopic retractible landing wheel compression member at said reenforced portion of the front spar.

11. In an amphibian aircraft, a main plane center section including front and rear spars each comprising upper and lower bars with interconnecting truss members, a localized portion of each of said spars being specially reenforced, motor mounting means at said reenforced portions, a compression member interposed between said portions, connecting means for an empennage supporting outrigger at said reenforced portion of the rear spar, and connecting means for a fluid pressure actuated telescopic retractible landing wheel compression member at said reenforced portion of the front spar.

12. In an amphibian aircraft, a body member, a main plane center section above said body member in symmetrical relation to the longitudinal axis of said body member, said center section including front and rear spar members, compression members at intervals between said spar members, connecting means between the lower portions of said spar members and tanks supported on said connecting means between the compression members and fluid pressure actuated retractible landing gear members attached to a spar member adjacent said tanks.

13. In an amphibian aircraft, a body member, a main plane center section above said body member in symmetrical relation to the longitudinal axis of said body member, said center section including front and rear spar members, compression members at intervals between said spar members, connecting means between the lower portions of said spar members, chocks on said spar members having upwardly divergent opposed faces, and tanks fitting between said chocks intermediate the compression members and supported on said connecting means and fluid pressure actuated retractible landing gear members attached to a spar member adjacent said tanks.

14. In an amphibian aircraft, a body member, a main plane center section above said body member in symmetrical relation to the longitudinal axis of said body member, said center section including front and rear spar members, compression members at intervals between said spar members, tanks in the compartments formed by the spar and compression members, the upper surfaces of said tanks being of substantially airfoil contour, and nose and tail section contour members secured respectively to the front and rear spar members and fluid pressure actuated retractible landing gear members attached to a spar member adjacent said tanks.

15. In an amphibian aircraft, a body member, a main plane center section above said body member in symmetrical relation to the longitudinal axis of said body member, said center section including front and rear spar members, compression members at intervals between said spar members, tanks in the compartments formed by said spar and compression members, a plate connecting the lower portions of said spar members and supporting the tanks, and strips underlying said plate and secured at their ends to the spar members and fluid pressure actuated retactible landing gear members attached to a spar member adjacent said tanks.

16. In an amphibian aircraft, a body member, a main plane center section above said body member in symmetrical relation to the longitudinal axis of said body member, said center section including front and rear spar members, compression members at intervals between said spar members, tanks in the compartments formed by said spar and compression members, a plate connecting the lower portions of said spar members and supporting the tanks, and strips overlying the tops of the tanks and secured at their ends to said spar members and fluid pressure actuated retractible landing gear members attached to a spar member adjacent said tanks.

17. In an amphibian aircraft, a main plane center section including front and rear spars each comprising upper and lower bulbed flanged T bars with interconnecting truss members, a localized portion of each of said spars being specially reenforced, motor mounting means at said reenforced portions, connecting means at said reenforced portion of the front spar for connecting retractable landing gear thereto and fluid pressure actuated telescopic retractable landing gear attached to said connecting means.

18. In an amphibian aircraft, a main plane center section including front and rear spars each comprising upper and lower T bars with interconnecting truss members, a localized portion of each of said spars being specially reenforced, motor suspension means at said reenforced portions, a compression member interposed between said portions, connecting means at said reenforced portion of the front spar for connecting retractable landing gear thereto and fluid pressure actuated telescopic retractable landing gear attached to said connecting means.

19. In an amphibian aircraft, a main plane center section including front and rear spars each comprising upper and lower bars with interconnecting truss members, a localized portion of each of said spars being specially reenforced, motor mounting means at said reenforced portions, a compression member interposed between said portions, connecting means for an empennage supporting outrigger at said reenforced portion of the rear spar, connecting means at said reenforced portion of the front spar for connecting retractable landing gear thereto and fluid pressure actuated telescopic retractable landing gear attached to said connecting means.

20. In an amphibian aircraft, a body member, a main plane center section including front and rear spars each comprising upper and lower bulbed flanged T bars with interconnecting truss members, a localized portion of each of said spars being specially reenforced, motor mounting means at said reenforced portions, connecting means at said reenforced portion of the front spar for connecting retractable landing gear thereto and fluid pressure actuated telescopic retractable landing gear attached to said connecting means and to said body.

21. In an amphibian aircraft, a body member, a main plane center section including front and rear spars each comprising upper and lower T bars with interconnecting truss members, a localized portion of each of said spars being specially reenforced, motor suspension means at said reenforced portions, a compression member interposed between said portions, connecting means at said reenforced portion of the front spar for connecting retractable landing gear thereto and fluid pressure actuated telescopic retractable landing gear attached to said connecting means and to said body.

22. In an amphibian aircraft, a body member, a main plane center section above said body member in symmetrical relation to the longitudinal axis of said body member, said center section including front and rear spar members, compression members at intervals between said spar members, connecting means between the lower portions of said spar members, tanks supported on said connecting means between the compression members and fluid pressure actuated telescopic retractable landing gear attached to one of said spar members and to said body member.

23. In an amphibian aircraft, a body member, a main plane center section above said body member in symmetrical relation to the longitudinal axis of said body member, said center section including front and rear spar members, compression members at intervals between said spar members, connecting means between the lower portions of said spar members, chocks on said spar members having upwardly divergent opposed faces, tanks fitting between said chocks intermediate the compression members and supported on said connecting means and fluid pressure actuated telescopic retractable landing gear attached to one of said spar members and to said body member.

24. In an amphibian aircraft, a body member, a main plane center section above said body member in symmetrical relation to the longitudinal axis of said body member, said center section including front and rear spar members, compression members at intervals between said spar members, tanks in the compartments formed by the spar and compression members, the upper surfaces of said tanks being of substantial airfoil contour, nose and tail section contour members secured respectively to the front and rear spar members and fluid pressure actuated telescopic retractable landing gear attached to one of said spar members and to said body member.

25. In an amphibian aircraft, a body member, a main plane center section above said body member in symmetrical relation to the longitudinal axis of said body member, said center section including front and rear spar members, compression members at intervals between said spar members, tanks in the compartments formed by said spar and compression members, a plate connecting the lower portions of said spar members and supporting the tanks, strips underlying said plate and secured at their ends to the spar members and fluid pressure actuated telescopic retractable landing gear attached to one of said spar members and to said body member.

26. In an amphibian aircraft, a body member, a main plane center section above said body member in symmetrical relation to the longitudinal axis of said body member, said center section including front and rear spar members, compression members at intervals between said spar members, tanks in the compartments formed by said spar and compression members, a plate connecting the lower portions of said spar members and supporting the tanks, strips overlying the top of the tanks and secured at their ends to said spar members and fluid pressure actuated telescopic retractable landing gear attached to one of said spar members and to said body member.

27. In an amphibian aircraft, a wing including front and rear spars, an elongated motor supporting frame beneath said plane with its longitudinal axis parallel to the longitudinal axis of the aircraft, connecting members connecting one end of said frame with both of said spars, a connecting member connecting the other end of said frame with one of said spars, and a fluid pressure actuated telescopic retractable landing gear member attached to said wing adjacent to a motor supporting frame connecting member.

28. In an amphibian aircraft, a wing including front and rear spars, an elongated motor supporting frame beneath said plane and projecting forwardly and rearwardly of the front spar, connecting members connecting both ends of said frame with the front spar, a connecting member connecting the rear end of said frame with the rear spar and a fluid pressure actuated telescopic retractable landing gear member attached to said wing adjacent to a motor supporting frame connecting member.

29. In an amphibian aircraft, a wing including front and rear spars, an elongated motor supporting frame beneath said plane and projecting forwardly and rearwardly of the front spar, connecting members connecting both ends of said frame with the front spar at points spaced along the latter, a connecting member connecting the rear end of said frame with the rear spar and a fluid pressure actuated telescopic retractable landing gear member attached to said wing adjacent to a motor supporting frame connecting member.

30. In an amphibian aircraft, a wing including front and rear spars, an elongated motor supporting frame beneath said plane and projecting forwardly and rearwardly of the main spar, connecting members connecting the front portion of said frame at spaced points thereon with the front spar at a single point thereon, a further connecting member connecting said frame at one of said points thereon to the front spar at a point spaced from the first mentioned connection point thereon, connecting member connecting the rear end of said frame with said rear spar and a fluid pressure actuated telescopic retractable landing gear member attached to said wing adjacent to a motor supporting frame connecting member.

31. In an amphibian aircraft, a wing including front and rear spars, an elongated motor supporting frame beneath said plane and projecting forwardly and rearwardly of the main spar, connecting members connecting the front portion of said frame at spaced points thereon with the front spar at a single point thereon, a further connecting member connecting said frame at one of said points thereon to the front spar at a point spaced from the first mentioned connection point thereon, connecting members connecting the rear end of said frame with the front spar at spaced points thereon, a connecting member connecting the rear end of said frame with said rear spar and a fluid pressure actuated telescopic retractable landing gear member attached to said wing adjacent to a motor supporting frame connecting member.

32. In an amphibian aircraft, a motor supporting ring, a plane above said ring and including a front spar, suspension members in W formation connecting said ring at points circumferentially spaced thereon with said spar at spaced points on the latter, and suspension members connecting said ring at said circumferentially spaced points with said spar at a point midway between the first mentioned connection points thereon.

33. In an amphibian aircraft, a horizontal motor supporting frame including longitudinal frame members in substantially pyramidal formation, a ring fixed to the divergent ends of said frame members, a plane above said frame and including front and rear spars, said frame projecting forwardly and rearwardly of the front spar, suspension members in W formation connecting said ring at points circumferentially spaced thereon with said spar at spaced points on the latter, and means connecting the rear end of said frame with said rear spar.

34. In an amphibian aircraft, a horizontal motor supporting frame including longitudinal frame members in substantially pyramidal formation, a ring fixed to the divergent ends of said frame members, a plane above said frame and including front and rear spars, said frame projecting forwardly and rearwardly of the front spar, suspension members in W formation connecting said ring at points circumferentially spaced thereon with said spar at spaced points on the latter, suspension members connecting the rear end of said frame with said front spar at said spaced points thereon, and means connecting the rear end of said frame with said rear spar.

35. In an amphibian aircraft, a horizontal motor supporting frame including longitudinal frame members in substantially pyramidal formation, a ring fixed to the divergent ends of said frame members, a plane above said frame and including front and rear spars, said frame projecting forwardly and rearwardly of the front spar, suspension members connecting said ring at points circumferentially spaced thereon with the front spar at spaced points along the latter, suspension members in W formation connecting said ring at said circumferentially spaced points with the front spar at a point midway between the first-mentioned connection points thereon, and means connecting the rear end of said frame with said rear spar.

36. In an amphibian aircraft, a horizontal motor supporting frame including longitudinal frame members in substantially pyramidal formation, a ring fixed to the divergent ends of said frame members, a plane above said frame and including front and rear spars, said frame projecting forwardly and rearwardly of the front spar, suspension members connecting said ring at points circumferentially spaced thereon with the front spar at spaced points along the latter, suspension members in W formation connecting said ring at said circumferentially spaced points with the front spar at a point midway between the first-mentioned connection points thereon, suspension members connecting the rear end of said frame with the front spar at spaced points thereon, and means connecting the rear end of said frame with said rear spar.

37. In an amphibian aircraft, a body member, a plane above said body member in symmetrical relation to the longitudinal axis of said body member, a plurality of tanks in said plane, at least one tank being disposed at each side of said axis, and a conduit extending beneath the tanks and in connection with each of the latter.

38. In an amphibian aircraft, a body member, a plane above said body member in symmetrical relation to the longitudinal axis of the body member, a plurality of tanks in said plane, at least one tank being disposed at each side of said axis, a horizontal conduit disposed between the body member and the lower surface of the plane, connection between each of the tanks and said conduit, and a streamline housing for said conduit.

39. In an amphibian aircraft, a body member, a plane above said body member in symmetrical relation to the longitudinal axis of the body member, a plurality of tanks in said plane, at least one tank being disposed at each side of said axis, a horizontal conduit extending transversely of said axis between the body member and the lower surface of the plane, connections between each of the tanks and said conduit, a motor supported at each end of said conduit, and a streamline housing for said conduit.

40. In an amphibian, a main plane section including front and rear spars each comprising upper and lower bars and interconnecting truss members, special reenforcing for a localized portion of each spar comprising a plate rigidly secured to and interconnecting the upper and lower bars, an engine supporting frame, and suspension means connecting said frame with the reenforced portions of said spars.

41. In an aircraft, having a lattice trussed structural member means for connecting said structural member and its lattice truss members comprising a flat plate adapted to extend substantially perpendicular to and longitudinally of the structural member, the front and rear edges of the plate being bent in opposite directions at an angle to the body of the plate to form flanges whereby lattice truss members may be attached to opposite sides of the plate and not interfere with the flanges, and ears integral with the flanges for attaching the plate to said structural member.

42. In a built up rib member comprising top and bottom strips connected by truss members, means for attaching the truss members to the strips comprising a plate extending in a plane substantially perpendicular to said strip, opposite edges of the plate being flanged, ears integral with the flanges for attaching the plate to the strip, the truss members being fastened on opposite sides of the plate.

43. In an aircraft, means for attaching truss members to a structural member comprising a plate extending in a plane substantially perpendicular to said structural member, flanges on opposite edges of the plate, said flanges extending in opposite directions, means for attaching the plate to the structural member, truss members being on opposite sides of the plate and attached thereto.

Signed at College Point, Long Island in the county of Queens and State of New York this 27th day of March A. D. 1929.

IGOR SIKORSKY.